(12) United States Patent
Chiba et al.

(10) Patent No.: US 10,713,117 B2
(45) Date of Patent: Jul. 14, 2020

(54) STORAGE SYSTEM AND METHOD FOR CONTROLLING STORAGE SYSTEM

(71) Applicant: Hitachi, Ltd., Tokyo (JP)

(72) Inventors: Takeru Chiba, Tokyo (JP); Mitsuo Hayasaka, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 16/327,349

(22) PCT Filed: Jun. 15, 2017

(86) PCT No.: PCT/JP2017/022160
§ 371 (c)(1),
(2) Date: Feb. 22, 2019

(87) PCT Pub. No.: WO2018/229944
PCT Pub. Date: Dec. 20, 2018

(65) Prior Publication Data
US 2019/0196908 A1    Jun. 27, 2019

(51) Int. Cl.
*G06F 11/10* (2006.01)
*G06F 3/06* (2006.01)
*G06F 12/00* (2006.01)

(52) U.S. Cl.
CPC ............ *G06F 11/1076* (2013.01); *G06F 3/06* (2013.01); *G06F 3/064* (2013.01); *G06F 3/067* (2013.01);
(Continued)

(58) Field of Classification Search
CPC ...... G06F 11/1076; G06F 3/06; G06F 3/0619; G06F 3/064; G06F 3/067; G06F 11/10; G06F 12/00
See application file for complete search history.

(56) References Cited

U.S. PATENT DOCUMENTS 8,819,338 B2 *  8/2014  Uehara ................. G06F 3/0688
                                                      711/114
9,921,914 B2 *  3/2018  Ptak .................... G06F 11/1096
(Continued)

FOREIGN PATENT DOCUMENTS

JP    2010-066832 A    3/2010
WO   2016/051512 A1   4/2016

OTHER PUBLICATIONS

Na, W., et al., "A Novel Network RAID Architecture with Out-of-band Virtualization and Redundant Management", 2008 14th IEEE International Conference on Parallel and Distributed Systems, Conference Location: Melbourne, VIC, Australia, Date of Conference: Dec. 8-10, 2008, pp. 105-112. (Year: 2008).*

(Continued)

*Primary Examiner* — Kyle Vallecillo
(74) *Attorney, Agent, or Firm* — Mattingly & Malur, PC

(57) ABSTRACT

Each of multiple nodes has a processor, a memory, and a storage region. In a process of updating a stripe, the processors generate an intermediate parity from a data block included in a first node and a parity block included in the first node and included in the stripe to be processed, transfer the intermediate parity to a second node, cause the intermediate parity to be stored as a parity in a block of the second node, and configure the stripe with the data block from which the intermediate parity has been generated, the block storing the parity, and a data block included in a node other than the first and second nodes and included in the stripe to be processed.

9 Claims, 22 Drawing Sheets

(52) U.S. Cl.
CPC ............ *G06F 3/0619* (2013.01); *G06F 11/10* (2013.01); *G06F 12/00* (2013.01)

(56) References Cited

U.S. PATENT DOCUMENTS

| | | | |
|---|---|---|---|
| 10,521,152 B2* | 12/2019 | Park | G06F 11/10 |
| 2010/0064103 A1 | 3/2010 | Matsui | |
| 2013/0290629 A1* | 10/2013 | Uehara | G06F 3/0688 711/114 |
| 2013/0339818 A1* | 12/2013 | Baker | G06F 3/0667 714/763 |
| 2014/0379990 A1* | 12/2014 | Pan | G06F 12/0804 711/135 |
| 2015/0033070 A1* | 1/2015 | Ma | G06F 11/1088 714/6.24 |
| 2016/0357440 A1* | 12/2016 | Wang | G06F 3/0611 |
| 2016/0357634 A1* | 12/2016 | Wang | G06F 11/00 |
| 2016/0371145 A1 | 12/2016 | Akutsu et al. | |
| 2017/0242732 A1* | 8/2017 | Vairavanathan | G06F 9/5038 |
| 2018/0129451 A1* | 5/2018 | Park | G06F 3/0658 |
| 2018/0246668 A1* | 8/2018 | Sakashita | G06F 3/0635 |
| 2018/0356979 A1* | 12/2018 | Yu | G06F 3/0689 |
| 2020/0012442 A1* | 1/2020 | Yang | G06F 3/0653 |

OTHER PUBLICATIONS

International Search Report of PCT/JP2017/022160 dated Aug. 29, 2017.

\* cited by examiner

FIG. 7

| Stripe# | Node#0 | Node#1 | Node#2 | Node#3 | Node#4 | Parity Node# | NEXT |
|---|---|---|---|---|---|---|---|
| 0 | 0x00 | 0x00 | 0x00 | 0x01 | 0x00 | 0x04 | 0 |
| 1 | 0x01 | 0x01 | 0x03 | 0x00 | 0x01 | 0x03 | 1 |
| 2 | 0x02 | 0x03 | 0x01 | 0x02 | 0x02 | 0x02 | 0 |
| 3 | 0x04 | 0x04 | 0x04 | 0x04 | 0x04 | 0x00 | 0 |
| 4 | 0x04 | 0x02 | 0x03 | 0x03 | 0x03 | 0x01 | 0 |
| ... | ... | ... | ... | ... | ... | ... | ... |
| S-1 | 0xfa | 0xfb | 0xfc | 0xfd | 0xfe | 0x00 | 0 |

STRIPE MANAGEMENT TABLE 1001

FIG. 8

| Node# | Status |
|---|---|
| 0 | Normal |
| 1 | Normal |
| 2 | Normal |
| 3 | Failed |
| 4 | Normal |
| ... | ... |

NODE MANAGEMENT TABLE 1002

FIG. 9

| Pool Volume # | Type | Drive# | Size(Block) | Status |
|---|---|---|---|---|
| 0x0000 | SSD | 0x01 | 0x20000000 | Normal |
| | | 0x02 | 0x20000000 | Normal |
| | | 0x03 | 0x20000000 | Normal |
| 0x0001 | NL-SAS | 0x10 | 0x20000000 | Normal |
| | | 0x11 | 0x20000000 | Normal |
| | | 0x12 | 0x20000000 | Failed |

DRIVE MANAGEMENT TABLE 1003

FIG. 10

| Pool Volume# | Type | Size(Block) | Node# |
|---|---|---|---|
| 0x0000 | SSD | 0x10000000 | 0x00 |
| 0x0001 | SSD | 0x20000000 | 0x00 |
| 0x0002 | SAS | 0x30000000 | 0x01 |
| 0x0003 | NL-SAS | 0x10000000 | 0x02 |
| ... | ... | ... | ... |

POOL VOLUME MANAGEMENT TABLE 1004

FIG. 11

| Pool # | Size(Block) | Unused(Block) | Pool Volume# |
|---|---|---|---|
| 0x0000 | 0x000100000000 | 0x000010000000 | 0x0000, 0x0001, 0x0002 |
| 0x0001 | 0x000200000000 | 0x000100000000 | 0x0003, 0x0005 |
| 0x0002 | 0x000300000000 | 0x000280000000 | 0x1000, 0x1001, 0x1002 |
| 0x0003 | 0x000100000000 | 0x000080000000 | 0x2000 |
| ... | ... | ... | ... |
| POOL MANAGEMENT TABLE 1005 | | | |

| VVOL# | Size(Block) | VVOL Page# | Pool Vol# | Pool Vol Page# |
|---|---|---|---|---|
| 0x0000 | 0x00100000 | 0x00 | 0x0000 | 0x0000 |
|  |  | 0x01 | 0x0000 | 0x0001 |
|  |  | 0x02 | NON-ALLOCATED | NON-ALLOCATED |
|  |  | ... | ... | ... |
| 0x0001 | 0x00020000 | 0x00 | 0x0001 | 0x1000 |
|  |  | 0x01 | 0x0002 | 0x2000 |
| ... | ... | ... | ... | ... |
| VVOL MANAGEMENT TABLE 1006 | | | | |

| In-Cycle Index# | Parity Node# |
|---|---|
| 0 | 3 |
| 1 | 4 |
| 2 | 1 |
| 3 | - |
| 4 | - |
| ... | ... |
| PARITY NODE TABLE 1007 ||

FIG. 13B

| Node# | LBA# |
|---|---|
| 3 | 0 |
| NON-ALLOCATED BLOCK MANAGEMENT TABLE 1008 ||

STORAGE SYSTEM AND METHOD FOR CONTROLLING STORAGE SYSTEM

TECHNICAL FIELD

The present invention relates to a storage system.

BACKGROUND ART

While the amount of investment in IT levels off, the amount of data is increasing. It is, therefore, important to reduce the cost of storage systems.

For example, it is expected that a ServerSAN storage system, which is one of distributed storage systems and in which a large number of general-purpose servers are connected to each other via a network and generate a storage pool, will be widely used in the future. Especially, it is considered that the ServerSAN storage system is an effective solution in a system that is configured to execute high-performance analysis and in which high-speed SSDs are installed in server nodes for large big data analysis.

In addition, a storage system in which multiple storage devices (nodes) form a redundant array of inexpensive (or independent) disks (RAID) group and which provides a logical volume generated based on the RAID group to a higher-level device (for example, a host computer) is known.

In the storage system having a redundant configuration, the bit cost or capacity efficiency of the RAID group is determined based on the ratio of the number of data blocks forming the RAID group and the number of protective blocks (mirror blocks or parity blocks) for the redundancy. In a configuration of RAID5 or RAID6, the capacity efficiency of a RAID group, which has a stripe configuration with a number n of data blocks (D) and a number m of parity blocks (P) or is configured with nD+mP, is n/(n+m). For example, the capacity efficiency of a RAID group configured with 3D+1P (RAID5) is 3/(3+1)=75%.

As a background technique in this technical field, Patent Literature 1 discloses a method for building a reliable system while reducing read latency by appropriately distributing and placing write data in nodes in a ServerSAN storage system.

In addition, as another background technique in this technical field, Patent Literature 2 discloses a method for improving the capacity efficiency of a system by expanding an existing RAID group (for example, 3D+1P→4D+1P).

CITATION LIST

Patent Literature

Patent Literature 1: International Publication WO2016/051512

Patent Literature 2: Japanese Laid-open Patent Publication No. 2010-66832

SUMMARY OF INVENTION

Technical Problem

Patent Literature 1 discloses a method for adding a node in a state in which a RAID group configuration (also referred to as stripe configurations) is maintained. In recent years, to reduce costs of introducing storage systems, the number of cases where operations are started with small configurations (small start) and nodes are sequentially added based on business scale is increasing.

There is, however, a problem that in the case where an operation is started with a small configuration and a node is added based on a method described in Patent Literature 1, even when the number of nodes is increased, an operation cannot be enabled with a stripe configuration having high capacity efficiency.

Specifically, for example, when an operation is started with 3 nodes, 2D+1P (capacity efficiency of 67%) is a stripe configuration with the highest capacity efficiency due to a RAID5 restriction in which data of stripes needs to be stored in different nodes.

On the other hand, in the case where an operation is started with 10 nodes, the operation is enabled with high capacity efficiency of 9D+1P (capacity efficiency of 90%). As described above, however, when nodes are repeatedly added so that the number of nodes is increased from 3 to 10, the operation needs to be continued in a state in which the capacity efficiency is 67%.

In addition, Patent Literature 2 discloses a method for improving the capacity efficiency of a system by expanding a stripe configuration. In the method described in Patent Literature 2, however, all data stored in the system needs to be relocated. Especially, in a ServerSAN storage system that is a main subject of the present invention or a scale-out system, a bandwidth between nodes is narrower than a bandwidth within storage in general in many cases, and there is a problem it takes long time to complete a process of expanding the stripe configuration.

The present invention aims to reduce the amount of data to be migrated between nodes upon the expansion of a stripe configuration and enable a process of adding a node to be executed at a high speed.

Solution to Problem

According to the present invention, a storage system includes a plurality of nodes each including a processor, a memory, and a storage region and forming a stripe including a data block and a parity block. In a process of updating the stripe, the processors generate an intermediate parity from a data block included in a first node and a parity block included in the first node and included in the stripe to be processed, transfer the intermediate parity to a second node, cause the intermediate parity to be stored as a parity in a block of the second node, and configure the stripe with the data block from which the intermediate parity has been generated, the block storing the parity, and a data block included in a node other than the first and second nodes and included in the stripe to be processed.

Advantageous Effects of Invention

According to the present invention, the amount of data to be migrated between nodes upon the expansion of a stripe configuration is reduced. Thus, in a scale-out configuration, it is possible to reduce the amount of data to be migrated for relocation and improve capacity efficiency at a high speed.

BRIEF DESCRIPTION OF DRAWINGS

FIG. 7 depicts the first embodiment of the present invention and is a diagram depicting an example of a stripe management table.

FIG. 8 depicts the first embodiment of the present invention and is a diagram depicting an example of a node management table.

FIG. 9 depicts the first embodiment of the present invention and is a diagram depicting an example of a drive management table.

FIG. 10 depicts the first embodiment of the present invention and is a diagram depicting an example of a pool volume management table.

FIG. 11 depicts the first embodiment of the present invention and is a diagram depicting an example of a pool management table.

FIG. 12 depicts the first embodiment of the present invention and is a diagram depicting an example of a VVOL management table.

FIG. 13A depicts the first embodiment of the present invention and is a diagram depicting an example of a parity node table.

FIG. 13B depicts the first embodiment of the present invention and is a diagram depicting an example of a non-allocated block management table.

DESCRIPTION OF EMBODIMENTS

Hereinafter, embodiments of the present invention are described with reference to the accompanying drawings.

Although the following describes various types of information for expression of "aaa tables", the various types of information may be expressed by data structures other than tables. The "aaa tables" may be referred to as "aaa information" in order to indicate that the various types of information do not depend on the data structures.

Although the following describes processes using "programs" as subjects, the programs are executed by processors (for example, central processing units (CPUs)) to execute defined processes using storage resources (for example, memories) and/or communication interface devices (for example, ports). Thus, the subjects of the processes may be the programs.

Processes described using the programs as the subjects may be executed by a processor or a computer (for example, a managing computer, a host computer, a controller, or the like) including the processor. In addition, the controller (storage controller) may be the processor or may include a hardware circuit configured to execute a part or all of processes to be executed by the controller. The programs may be installed in controllers from a program source. The program source may be a program distribution server or a computer-readable storage medium.

In the following description, IDs are used as identification information of elements, but other identification information may be used instead of or as well as the IDs. In addition, in the following description, when elements of the same type are not distinguished from each other, a reference symbol or a common number used as a reference symbol is used. When elements of the same type are distinguished from each other, reference symbols of the elements are used or IDs assigned to the elements are used instead of the reference symbols.

In addition, in the following description, an input/output (I/O) request is a write request or a read request and may be referred to as access request.

First Embodiment

Figure 1:
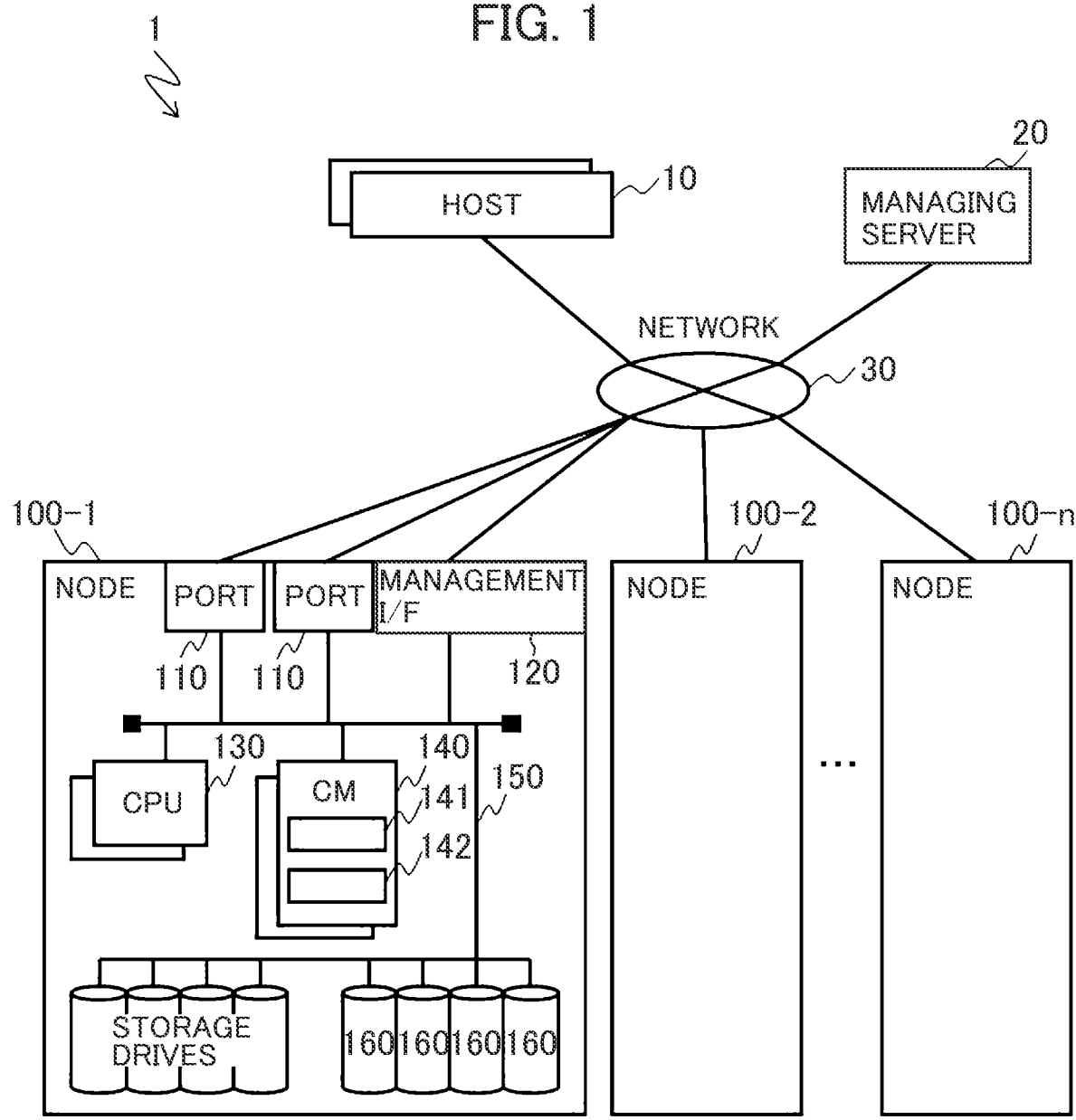
FIG. 1 depicts a first embodiment of the present invention and is a block diagram depicting an example of a hardware configuration of a computer system.

An overview of a computer system including a storage system according to a first embodiment is described. FIG. 1 is a block diagram depicting an example of a hardware configuration of the computer system according to the first embodiment.

The computer system 1 includes one or more host computers (hereinafter referred to as host) 10, a managing server 20, and a plurality of nodes 100-1 to 100-n. The host 10, the managing server 20, and the nodes 100-1 to 100-n are connected to each other via a network 30. When the nodes 100 are not identified, "–" and symbols after "–" are omitted and a symbol "100" is used. The same applies other constituent elements.

The network 150 may be a local area network (LAN) or a wide area network (WAN). In addition, the host 10 and the nodes 100 may be a single computer. In addition, the host 10 and the nodes 100-1 to 100-$n$ may be virtual machines, respectively.

The host 10 is, for example, a computer configured to execute an application. The host 10 reads, from the nodes 100, data to be used by the application and writes data generated by the application to the nodes 100.

The managing server 20 is a computer to be used by an administrator. The managing server 20 may include an input device (not depicted) configured to input information and an output device (not depicted) configured to display information. The managing server 20 receives settings of a process of relocating data upon the addition or removal of a node 100 in accordance with an operation of the input device by the administrator and causes the nodes 100 to execute the process of relocating received data.

Each of the nodes 100 includes one or more ports 110, one or more management I/Fs 120, one or more CPUs 130, one or more cache memories (CMs in FIG. 1) 140, one or more storage drives 160, and an internal network 150.

The ports 110, the management I/F 120, the CPUs 130, the CMs 140, the storage drives 160 are connected to each other via the internal network 150.

The ports 110 are an example of an interface with the host 10. The ports 110 connect the node 100 to various devices such as the other nodes 100 via the network 150.

The management I/F 120 is an interface for connecting the node 100 to the managing server 20. The ports 110 may be the same as the management I/F 120.

The CPUs 130 are controllers and execute programs stored in control program storage regions 142 of the cache memories 140 and execute various processes. The CPUs 130 transmit various commands (for example, a SCSI read command, a SCSI write command, and the like) to the storage drives 160.

The cache memories 140 temporarily store data (write data) to be written to the storage drives 160 from the host 10 and data (read data) read from the storage drives 160.

In addition, in the cache memories 140, the control program storage regions 142 storing the various programs and control information storage regions 141 storing various types of information are set. The information may be stored in a dedicated memory other than the cache memories 140. In addition, a plurality of constituent storage regions included in the storage drives 160 and the cache memories 140 may be used to form a logical shared memory and manage caches for the various types of information.

Each of the storage drives 160 includes one or more storage media. The storage media are, for example, magnetic disks, flash memories, or other nonvolatile semiconductor memories (PRAMs, ReRAMs, or the like).

The nodes 100 manage a capacity pool (hereinafter merely referred to as pool) composed of storage regions of multiple storage drives 160. The nodes 100 use storage regions within the pool to configure RAID groups. Specifically, the nodes 100 use the storage drives 160 within the nodes to configure multiple logical RAID groups.

Each of the logical RAID groups are composed of multiple sub-storage region strings. Each of the sub-storage region strings is composed of multiple sub-storage regions. The multiple sub-storage regions extend across the multiple storage drives 160 forming the RAID groups and correspond to the multiple storage drives 160.

A single sub-storage region is referred to as "stripe block" and a sub-storage region string is referred to as "stripe". A storage region of a RAID group is composed of multiple stripe strings.

RAID has some levels (hereinafter referred to as "RAID levels"). For example, in RAID5, data specified from a host computer corresponding to RAID 5 and to be written is divided into data items (hereinafter referred to as "data units") of a predetermined size. Each of the data units is divided into multiple data elements. The multiple data elements are written to multiple stripe blocks within the same stripe.

In RAID5, redundant information (hereinafter referred to as "redundant code") that is referred to as "parity" is generated for each of the data units in order to rebuild data elements that cannot be read from a corresponding storage drive 160 due to a failure that has occurred in the storage drive 160 or a node 100.

The redundant code is written to a stripe block within the same stripe as the multiple data elements. In the first embodiment, a stripe block storing user data is referred to as "data block", and a stripe block storing parity data is referred to as "parity block".

For example, when the number of storage drives 160 (or nodes 100) forming a RAID group is 4, 3 data elements forming a data unit are written to 3 data blocks corresponding to x3 storage drives 160 among the 4 storage drives 160, and a redundant code is written to a parity block corresponding to the single remaining storage drive 160. When data elements are not distinguished from a redundant code, the data elements and the redundant code are referred to as stripe blocks in some cases.

In RAID6, two types of redundant codes (referred to as P parity and Q parity) are generated for each of data units and written to different parity blocks within the same stripe. Thus, when 2 data elements among multiple data elements forming a data unit cannot be read, the 2 data elements can be restored from the two types of redundant codes.

RAID levels other than the levels described above exist (for example, RAID1 to RAID4). As techniques for making data redundant, triplication, a triple parity technique using 3 parities, and the like are known. As techniques for generating a redundant code, various techniques such as a Reed-Solomon code using Galois operation and even-odd exist. The following mainly describes RAID5. In the following description, however, a technique for making data redundant can be replaced with the aforementioned techniques.

When any of the storage drives 160 or any of the nodes 100 fails, a node 100 restores a data element stored in the failed storage drive 160.

Specifically, the storage drives 160 included in the nodes 100 may configure RAID groups, and the RAID groups may be configured between the nodes 100.

A CPU 130 acquires stripe blocks (for example, other data blocks and parity blocks) necessary to restore the data element stored in the failed storage drive 160 via ports 110 from storage drives 160 storing the data and included in other multiple nodes. The CPU 130 causes the acquired stripe blocks to be stored in a cache memory 140. After that, the CPU 130 restores the stripe blocks or parity blocks based on the stripe blocks of the cache memory 140 and causes the stripe blocks to be stored in a predetermined storage drive 160.

For example, for a stripe block of a RAID group with a RAID5 configuration, a CPU 130 generates a P parity by calculating an exclusive OR (XOR) of multiple data blocks forming a stripe. For a data block of a RAID group with a RAID6 configuration, a CPU 130 generates a Q parity by multiplying multiple data blocks forming a stripe by a predetermined coefficient and calculating an exclusive OR of the data blocks.

Processes of the CPUs 130 are described as processes of the nodes 100 in some cases.

Figure 2:
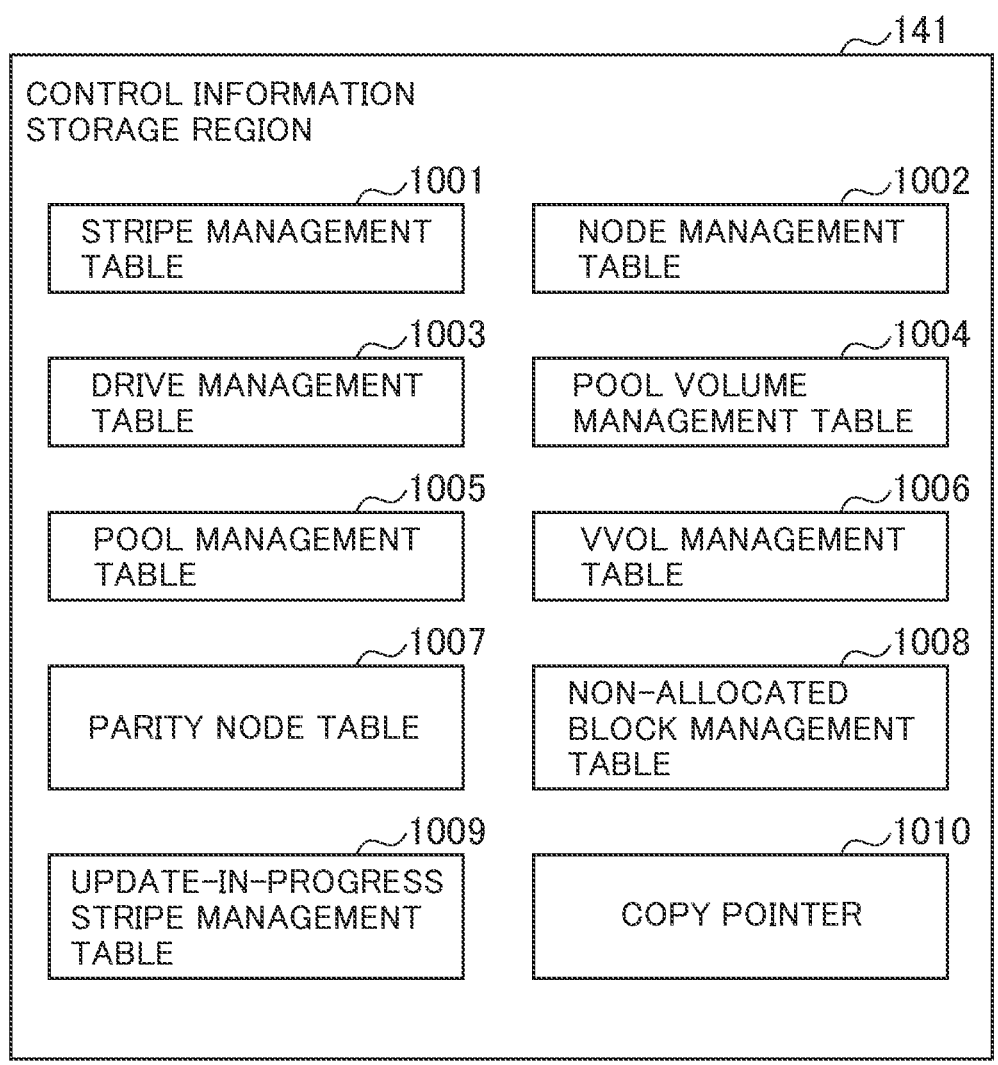
FIG. 2 depicts the first embodiment of the present invention and is a block diagram depicting an example of a control information storage region of a cache memory.

FIG. 2 is a block diagram depicting a control information storage region 141 within a cache memory 140.

The control information storage region 141 stores a stripe management table 1001, a node management table 1002, a drive management table 1003, a pool volume management table 1004, a pool management table 1005, a VVOL management table 1006, a parity node table 1007, an update-in-progress stripe management table 1009, a non-allocated block management table 1008, and a copy pointer 1010. The information is described later.

Figure 3:
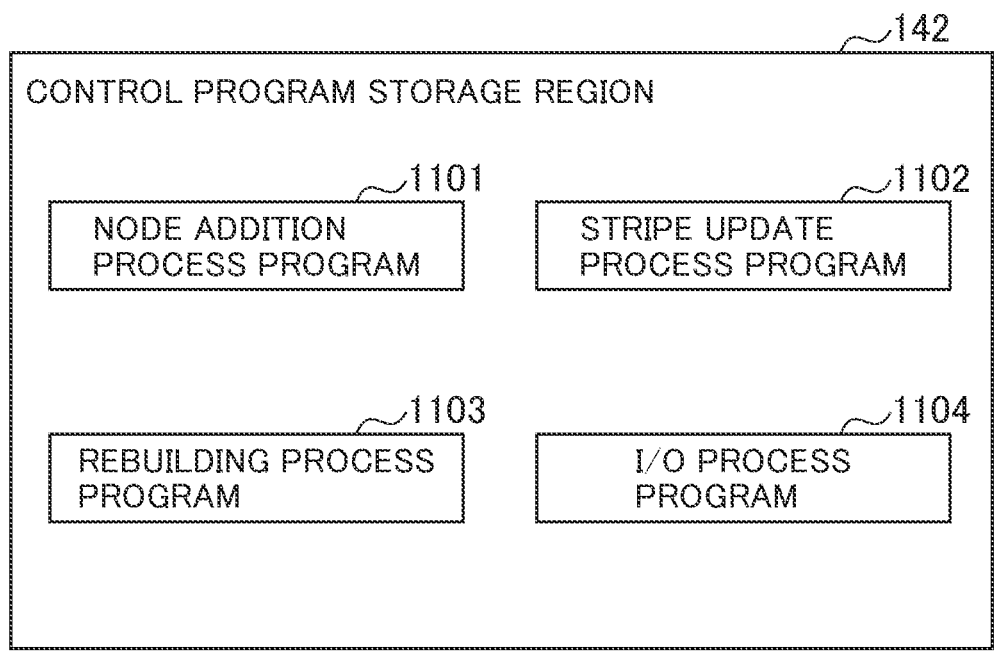
FIG. 3 depicts the first embodiment of the present invention and is a block diagram depicting an example of a control program storage region of the cache memory.

FIG. 3 is a block diagram depicting a control program storage region 142 of the cache memory 140.

The control program storage region 142 stores a node addition process program 1101, a stripe update process program 1102, a rebuilding process program 1103, and an I/O process program 1104. Processes of the programs other than the I/O process program 1104 are described later. The I/O process program 1104 receives an access request and executes reading and writing from and to a storage drive 160. A known or publicly known technique may be applied to the I/O process program 1104.

The CPUs 130 execute the programs, thereby operating as functional units for providing predetermined functions. For example, the CPUs 130 execute processing in accordance with the node addition process program 1101, thereby functioning as node adders. The same applies the other programs. In addition, the CPUs 130 operate as functional units for providing functions of multiple processes to be executed by the programs. The computers and the computer system include these functional units.

The programs that enable the functions of the nodes 100 and information such as the tables can be stored in a storage device such as a storage drive 160, a nonvolatile semiconductor memory, a hard disk drive, a solid state drive (SSD) or a computer-readable non-transitory data storage medium such as an IC card, an SD card, or a DVD.

Figure 4:
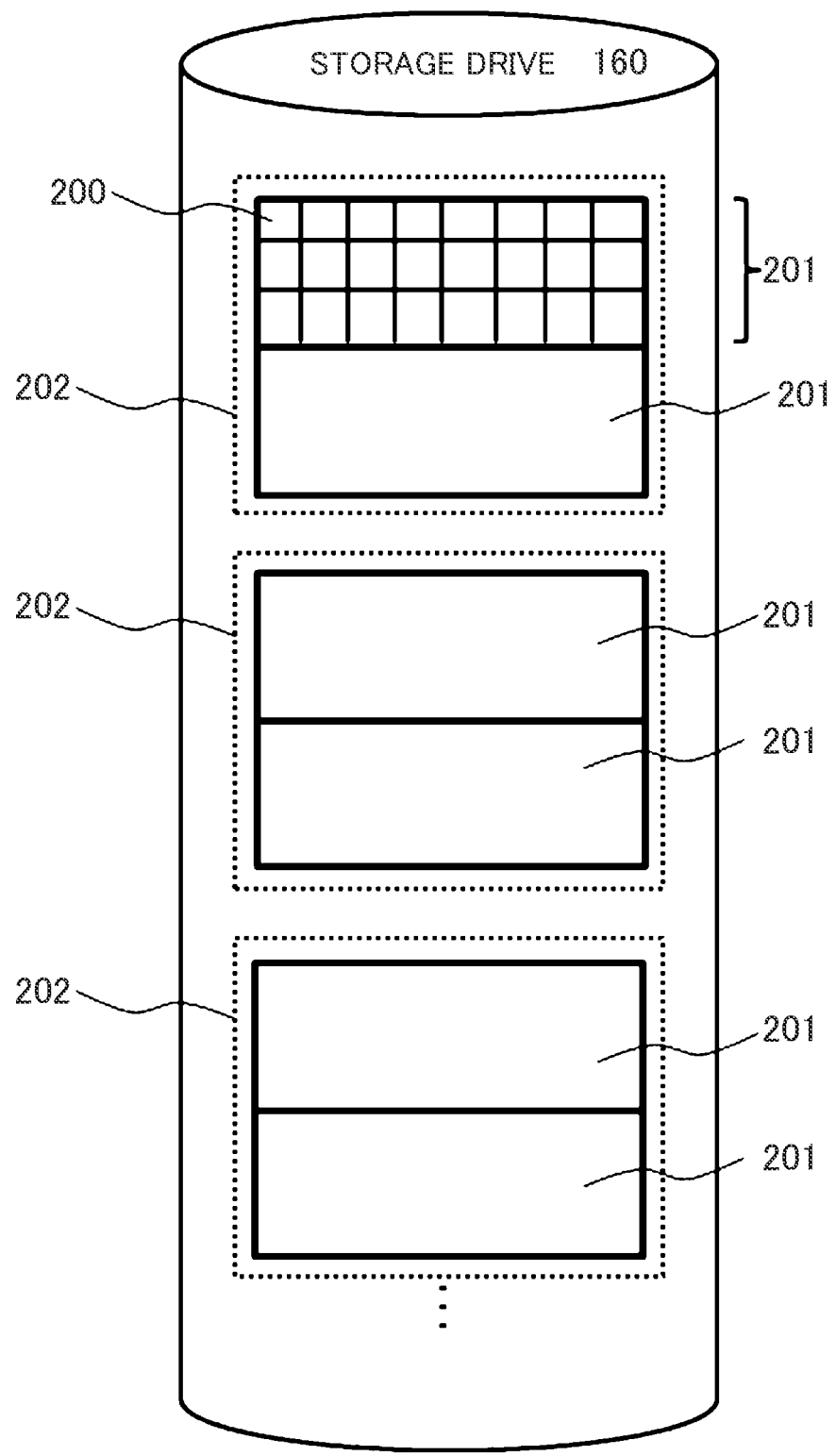
FIG. 4 depicts the first embodiment of the present invention and is a block diagram depicting an example of a data configuration of a storage drive.

FIG. 4 is a block diagram depicting an example of a data configuration of a storage drive 160.

The storage drive 160 receives and transmits data between devices such as the nodes 100 using, as units, subblocks 200 that are the minimum units (of, for example, 512 bytes) of SCSI command processing.

Slots 201 are management units for caching data within the cache memory 140 and have, for example, a capacity of 256 KB. Each of the slots 201 is composed of a set of multiple continuous subblocks 200. A stripe block 202 stores multiple (for example, 2) slots 201.

Figure 5A:
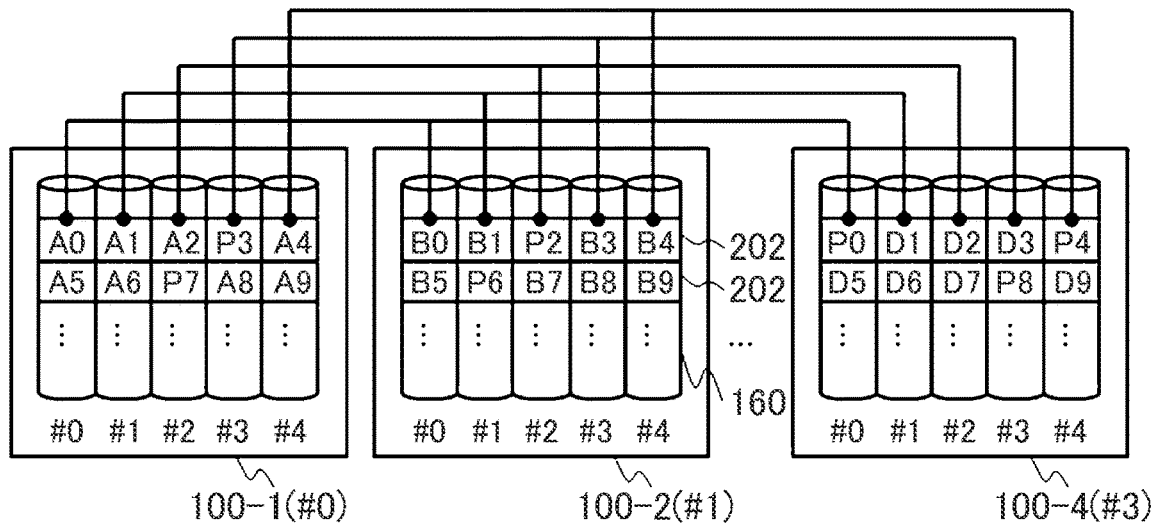
FIG. 5A depicts the first embodiment of the present invention and is a diagram depicting an example of a RAID group configuration.
Figure 5B:
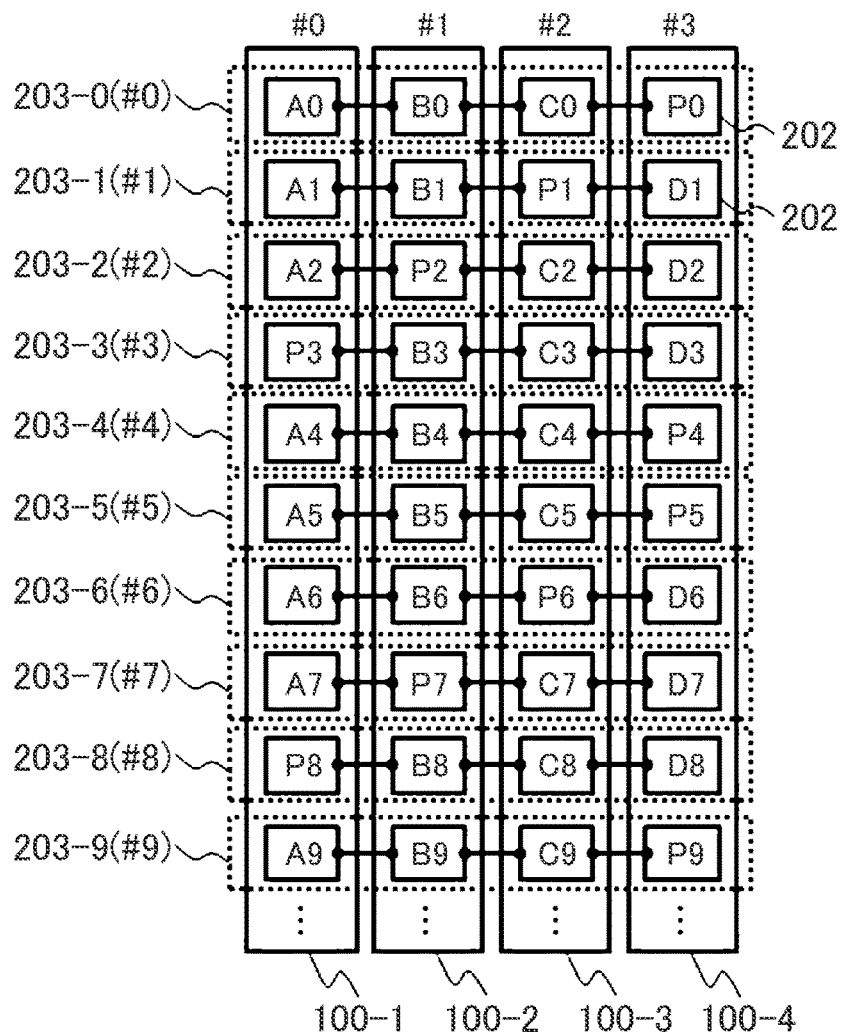
FIG. 5B depicts the first embodiment of the present invention and is a diagram depicting an example of data placement in the RAID group configuration.

FIGS. 5A and 5B are schematic diagrams depicting RAID group configurations according to the first embodiment.

FIG. 5A is a diagram depicting storage drives 160 included in nodes 100-1 to 100-4 and details of stripe configurations. FIG. 5B is a diagram depicting the arrangement of stripe blocks 202 included in the nodes 100-1 to 100-4. FIGS. 5A and 5B depict an example in which n=4 and a RAID5 group is configured by the 4 nodes 100.

Each of the nodes 100 includes multiple storage drives 160, while each of the storage drives 160 is divided into stripe blocks 202 of a certain size.

In the computer system 1, the managing server 20 selects predetermined stripe blocks 202 included in the nodes 100-1 to 100-4 and configures logical RAID groups (stripes 203) between the nodes 100-1 to 100-4. In FIG. 5A, an illustration of the node 100-3 is omitted.

In FIG. 5B, a stripe 203-0 is composed of stripe blocks 202 indicated by "A0", "B0", "C0", and "P0". "A0", "B0", "C0", and "P0" indicate initial stripe blocks 202 included in drives #0 of the nodes 100-1 to 100-4.

FIG. 5B depicts an example in which stripes 203-0 to 203-9 are configured in the nodes 100-1 to 100-4.

Hereinafter, stripe blocks 202 that are "A0", "B0", "C0", and the like depicted in FIG. 5B and store user data are referred to as data blocks, while stripe blocks 202 that are "P0" and the like depicted in FIG. 5B and store parity data are referred to as parity blocks.

When two or more stripe blocks 202 that are among stripe blocks 202 forming a stripe 203 exist in the same node 100, and a failure occurs in the node, a degree of redundancy of the stripe 203 is reduced by 2 or more at once and data may be lost. Thus, each of all stripes 203 needs to be composed of stripes 202 within different nodes 100.

The number of stripe blocks 202 forming each stripe 203 does not need to be equal to the number of nodes 100. For example, when a number 3D+1P of stripes exist in the computer system 1 including 10 nodes 100, it is sufficient if 4 nodes 100 are selected from among the 10 nodes 100 and predetermined blocks 202 form stripes 203 in the nodes 100.

In the following description, only when the configurations of the storage drives 160 included in the nodes 100 need to be described, only FIG. 5A is used for the description. Otherwise, FIG. 5B is used for the description in order to simplify the description.

Figure 6:
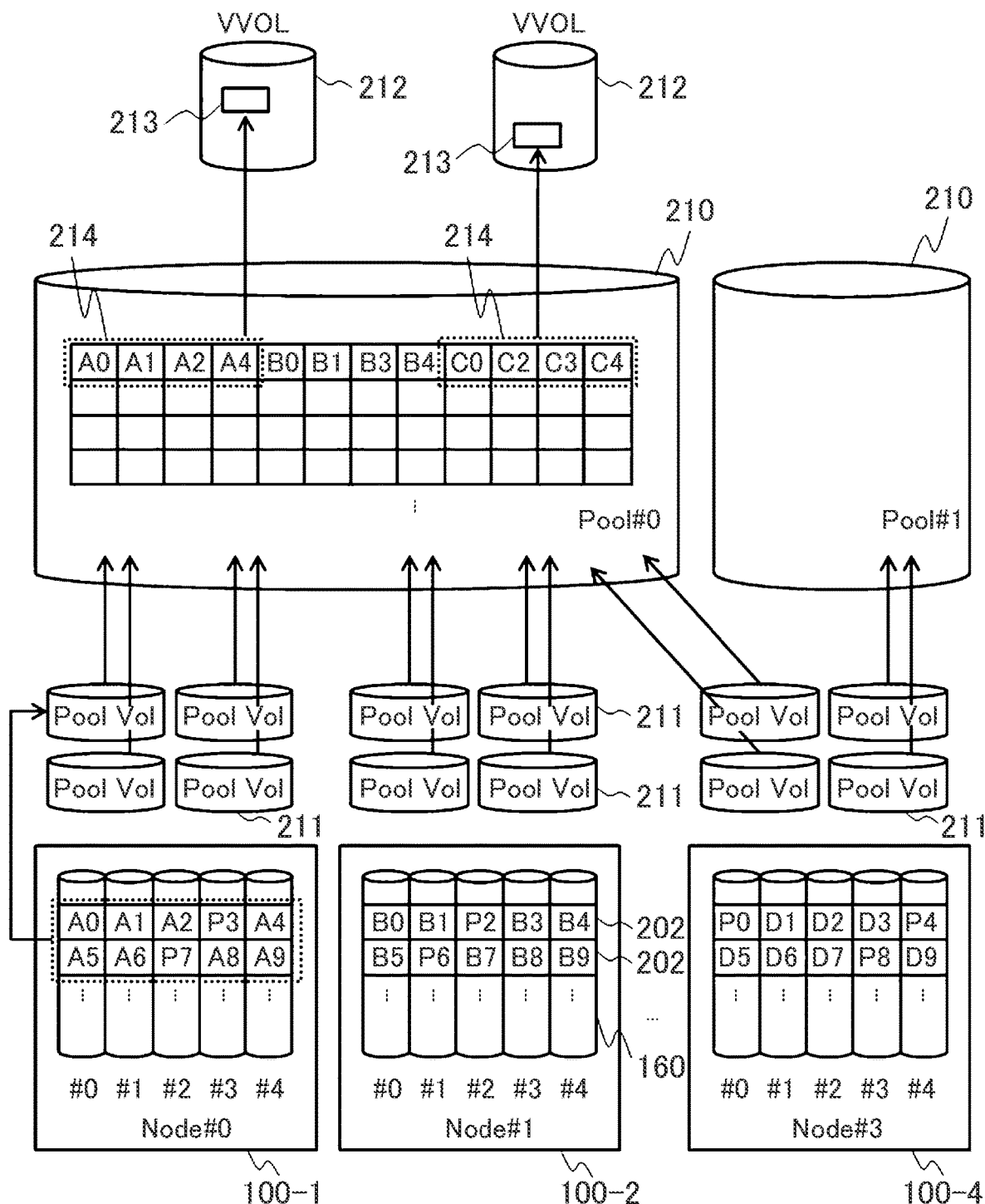
FIG. 6 depicts the first embodiment of the present invention and is a diagram depicting an example of a logical configuration of a storage region of the computer system.

FIG. 6 is a diagram depicting an example of a logical configuration of the computer system according to the first embodiment.

The computer system 1 configures one or more capacity pools 210 (hereinafter merely referred to as pools) by bundling regions of the storage drives 160 included in the multiple nodes 100. Each of the pools 210 is composed of data blocks excluding regions storing parity blocks from all regions of the storage drives 160.

As described above, the storage drives 160 included in the nodes 100 may be flash memory drives, SAS drives, SATA drives, and the like and may be multiple types of storage devices having different types of performance and different characteristics. When storage drives 160 having different types of performance and different characteristics exist in the pools 210, a storage drive 160 having low performance may be a bottle neck.

It is, therefore, desirable that each of the pools 210 may be composed of storage drives 160 having the same performance and the same characteristic. For example, when storage drives 160 having different types of performance and different characteristics exist in each of the nodes 100, it is sufficient if multiple pools 210 are configured based on the performance and the characteristics. Alternatively, each of the pools 210 may be divided into logical partitions (or tiers) and each page 213 described later is composed of data blocks existing in a single tier.

Each of the nodes 100 divides an internal physical storage region into regions of a predetermined size to generate pool volumes 211 (also referred to as pool vol). It is desirable that the pool volumes 211 be composed of storage drives 160 having a single type of performance and a single characteristic in order to maximize the performance of the storage drives 160.

The nodes 100 configure the pools 210 by allocating the pool volumes 211 to the appropriate pools 210. In other words, it can be considered that each of the pools 210 is composed of multiple pool volumes 211. Pool volumes 211 included in the same node 100 may not be allocated to the same pool 210 and may be allocated to multiple pools 210. In an example depicted in FIG. 6, 2 pool volumes 211 that are among 4 pool volumes 211 of a node #3 are allocated to a pool #0, and 2 pool volumes 211 that are among the 4 pool volumes 211 of the node #3 are allocated to a pool #1.

Multiple virtual volumes (VVOL: Virtual VOLume) 212 are generated in each of the pools 210. The VVOLs 212 are virtual storage devices and can be referenced by the host 10. The managing server 20 generates the VVOLs 212 of a predetermined size via the management I/Fs 120 of the nodes 100 in accordance with an instruction from an administrator of the computer system 1.

The size of each generated VVOL 212 does not depend on a total available capacity of the actual storage drives 160. The nodes 100 dynamically allocate storage regions (pool vol pages 214) included in the pools 210 to VVOLs 212 for storage regions (VVOL pages 213) included in the VVOLs 212 indicated by an I/O request (host I/O) from the host 10. The storage regions of the VVOLs 212 can be managed using the VVOL pages 213.

When the VVOL pages 213 are composed of stripe blocks 202 belonging to different pool volumes 211, input and output to and from the same VVOL page 213 are distributed in multiple nodes 100, and an increase in latency in transfer between nodes 100 is a problem. It is, thus, desirable that each of the VVOL pages 213 be composed of stripe blocks 202 included in the same pool volume 211, as described in the first embodiment.

Each of the pool vol pages 214 is composed of one or more data blocks in each of the capacity pools 210. The number of data blocks forming each of the pool vol pages 214 is uniquely defined in the computer system but does not depend on the configuration of a RAID group. Thus, even when the configuration of a RAID group is changed, allocation between the pool vol pages 214 and data blocks does not need to be changed.

When multiple tiers exist in each of the pools 210, the nodes 100 may record the frequency of access for each VVOL page 213 and allocate a pool vol page 214 formed in a high-performance storage drive 160 such as a flash memory drive to a VVOL page 213 that is frequently accessed. The nodes 100 may continuously monitor loads of the VVOL pages 213 and periodically change the allocation of the VVOL pages 213.

FIG. 7 is a diagram depicting an example of the stripe management table 1001. The stripe management table 1001 is common information in the computer system 1 and indicates combinations of stripe blocks in nodes 100. The common information in the computer system 1 can be referenced by other nodes 100 and the managing server 20.

The stripe management table 1001 includes, in a single entry, fields of stripe #2000 storing identifiers of stripes 203, node #2001 holding storage positions of the stripes 203 for identifiers of the nodes 100 forming the computer system 1, parity node #2002 storing identifiers of nodes 100 storing parity blocks included in the stripes 203, and NEXT 2003 storing a flag indicating that a stripe is to be processed next. FIG. 7 depicts an example in which the nodes 100 are 5 nodes indicated by "#0" to "#4".

Stripe #2000 indicates the identifiers of the stripes 203. Node #2001 indicates the positions (LBA#: logical block addresses) of stripe blocks included in the nodes associated with stripe #2000. Parity node #2002 indicates the nodes 100 storing the parity blocks.

Based on this table, each of the nodes 100 can reference node #2001 of the nodes forming the stripes 203, the positions of the stripe blocks within the nodes 100, and the nodes 100 storing the parity blocks.

For example, in the example depicted in FIG. 7, a stripe 203 indicated by "0" in stripe #2000 is composed of 4 stripe blocks 202 of (node#, LBA#)=(0, 0×00), (1, 0×00), (2, 0×00), (3, 0×01), and (4, 0×00), and a stripe block 202 of the node #4 is a parity block.

FIG. 7 depicts an example of the stripe management table in the case where the number of parity blocks of each stripe is 1 or in the case of RAID5. When the number of parity blocks of each stripe is 2 or in the case of RAID6, a field for Q parity blocks is added to parity node #2002.

A stripe 203 may not be included in all nodes 100 included in the computer system 1, depending on a configuration. In this case, the positions (LBA#) of stripe blocks within the nodes 100 are stored in only node #2001 storing stripe blocks 202 forming stripes indicated in stripe #2000, and a predetermined invalid value is stored in node #2001 storing other stripe blocks 202.

In NEXT 2003, the flag indicating a stripe to be subjected to a stripe update process next is stored, and "1" is set for a stripe to be processed next.

As described later, the update (update of a stripe configuration) of the stripe management table 1001 is executed in the reconfiguration of stripes 203 upon the addition of a node 100. In the update of the stripe configuration, the process is executed using the stripe management table 1001 and the update-in-progress stripe management table 1009. Fields of the update-in-progress stripe management table 1009 are the same as those of the stripe management table 1001 depicted in FIG. 7. During the stripe configuration update process, information indicating the stripe configuration after the update is stored in the update-in-progress stripe management table 1009.

The stripe configuration update process is executed upon the addition of a new node 100 to a RAID group and is a process of distributing a node 100 storing a parity block.

FIG. 8 is a diagram depicting an example of the node management table 1002. The node management table 1002 is common information in the computer system 1 and is used to manage states of nodes 100. The common information in the computer system 1 can be referenced by other nodes 100 and the managing server 20, for example.

The node management table 1002 includes fields of node #2010 storing identifiers of the nodes 100 and status 2011 storing states of the nodes 100. Node #2010 indicates the identifiers of the nodes. In status 2011, normal or failed is stored as each of the states of the nodes 100.

FIG. 9 is a diagram depicting an example of the drive management table 1003. The drive management table 1003 is information to be managed for each node 100 and to be used to manage drive information within the nodes 100. The common information in the computer system 1 can be referenced by other nodes 100 and the managing server 20, for example.

The drive management table 1003 includes fields of pool volume #2020, type 2021, drive #2022, size 2023, and status 2024 in a single entry.

In pool volume #2020, identifiers of pool volumes 211 are stored. In type 2021, types of storage drives 160 that are an SSD, a near line (NL)-SAS, and the like are stored.

In drive #2022, identifiers of the storage drives 160 that are uniquely defined in the nodes 100 are stored. In size 2023, capacities (for example, units of subblocks 200) of the storage drives 160 are stored. In status 2024, states of the storage drives 160 are stored.

The nodes 100 can acquire the numbers, types, and capacities of the storage drives 160 within the nodes 100 from the drive management table 1003.

In status 2024, "normal", "failed", and the like that are states of the drives are stored. for the purpose of preventive maintenance, however, a status such as "warning" other than the aforementioned statuses may be stored in status 2024 for a storage drive 160 of which the number of errors exceeds a threshold.

FIG. 10 is a diagram depicting an example of the pool volume management table 1004.

The pool volume management table 1004 is common information in the computer system 1 and is used by the computer system 1 to manage capacities of the pool volumes 211 and nodes 100 in which the pool volumes 211 exist. The common information in the computer system 1 can be referenced by other nodes 100 and the managing server 20, for example.

The pool volume management table 1004 includes, in a single entry, fields of pool volume #2030 storing identifiers of the pool volumes 211, type 2031 storing types of the pool volumes 211, size 2032 storing the capacities of the pool volumes 211, and node #2033 storing identifiers of nodes 100 to which the pool volumes 211 have been allocated.

By referencing the pool volume management table 1004, the computer system 1 can acquire the capacities and types of the pool volumes 211 and the identifiers of the nodes 100 of the pool volumes 211. The pool volume management table 1004 is used to determine a pool volume 211 to be added to a pool 210.

FIG. 11 is a diagram depicting an example of the pool management table 1005.

The pool management table 1005 is common information in the computer system 1 and is used by the computer system 1 to manage the pools 210. The common information in the computer system 1 can be referenced by other nodes 100 and the managing server 20, for example.

The pool management table 1005 includes fields of pool #2040, size 2041, unused 2042, and volume #2043 in a single entry.

In pool #2040, identifiers of the pools 210 are stored. In size 2041, capacities (numbers of blocks) of the entire pools 210 are stored. In unused 2042, available capacities (number of blocks) among the capacities indicated by size 2041 are stored. In pool volume #2043, identifiers of all pool volumes 211 allocated to the pools 210 are stored. By referencing the pool management table 1004, the computer system 1 can acquire usage statuses of the pools 210.

FIG. 12 is a diagram depicting an example of the VVOL management table 1006. The VVOL management table 1006 is common information in the computer system 1 and indicates correspondence relationships between VVOL pages 213 and pool vol pages 214. The common information in the computer system 1 can be referenced by other nodes 100 and the managing server 20, for example.

The VVOL management table 1006 includes fields of VVOL #2050, VVOL page #2052, pool vol #2053, and pool vol page #2054 in a single entry.

In VVOL #2050, identifiers of VVOLs 212 are stored. In size 2051, the capacities (numbers of blocks) of the VVOLs 212 are stored. In VVOL page #2052, identifiers of VVOLs pages 213 included in the VVOLs are stored.

In pool vol #2052, identifiers of pool volumes 211 allocated to the VVOLs 212 are stored. In pool vol page #2054, identifiers of pool vol pages 214 allocated to the VVOL pages 213 are stored.

In pool vol #2053 and pool vol page #2054 associated with unused VVOL page #2052, a value corresponding to "non-allocated" is stored. By referencing the VVOL management table 1006, the computer system 1 can acquire usage statuses of the VVOLs 212 and information of allocation destinations.

FIG. 13A is a diagram depicting an example of the parity node table 1007.

The parity node table 1007 is common information in the computer system 1 and is used to distribute nodes 100 storing parity blocks in the stripe configuration update process described later. The common information in the computer system 1 can be referenced by other nodes 100 and the managing server 20, for example.

The parity node table 1007 includes fields of intra-cycle index (in-cycle index depicted in the drawing) #2060 and parity node #2061 in a single entry.

The stripe configuration update process described later is periodically executed for each group of a number N+2 of stripes 203. In intra-cycle index #2060, offset values of 0 to N+1 within a cycle are stored as indices within the cycle. N indicates the number of nodes 100 including data blocks before the addition of a new node 100. In other words, N indicates the number of data blocks before the addition of a node 100.

Parity node #2061 indicates nodes 100 storing parity blocks in stripes 203 corresponding to the offset values.

Figure 14:
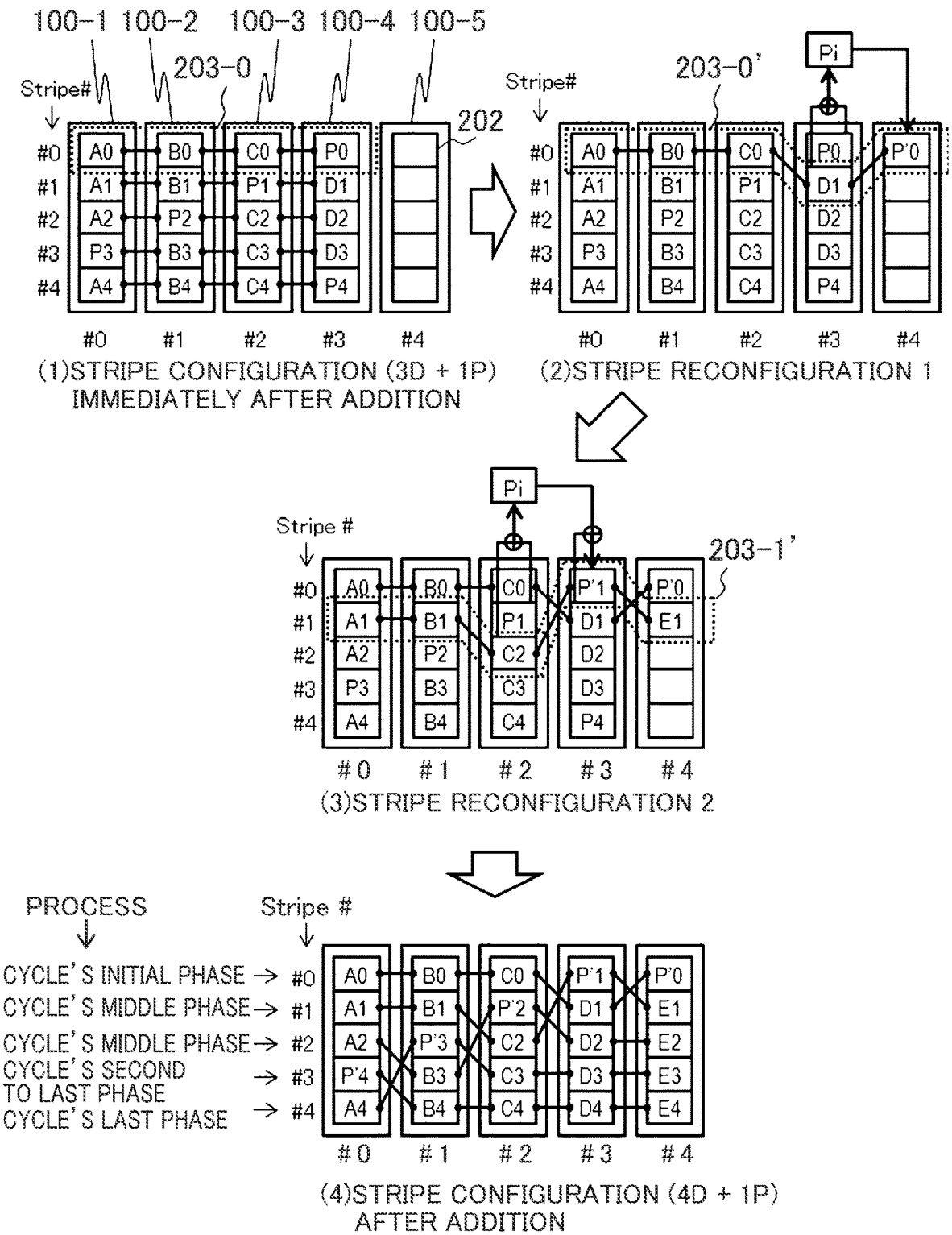
FIG. 14 depicts the first embodiment of the present invention and is a diagram depicting an overview of a stripe configuration update process upon the addition of a node.

As depicted in FIG. 14, the first embodiment describes an example in which a single node 100 is added to a RAID group of 3D+1 in a state in which 4 nodes 100 exist.

When the single node 100 is added to the 4 nodes 100, a process of distributing parity blocks into the 5 nodes 100 is executed as described later. In the first embodiment, the stripe configuration update process is repeatedly executed 5 times to distribute parity blocks in the nodes 100 including the newly added node 100 so that multiple parity blocks do not duplicate in the same node 100. Specifically, in the first embodiment, the process to be executed 5 times is a single cycle.

The use of the parity node table 1007 is described in detail together with the following description of the stripe configuration update process.

FIG. 13B is a diagram depicting an example of the non-allocated block management table. The non-allocated block management table 1008 is common information in the computer system 1 and is used to acquire regions for storing parity blocks after update in the stripe configuration update process described later. The common information in the computer system 1 can be referenced by other nodes 100 and the managing server 20, for example.

The non-allocated block management table 1008 includes fields of node #2070 and LBA #2071 in a single entry. In node #2070, identifiers of nodes 100 are stored. In LBA #2071, addresses of non-allocated blocks are stored.

In the stripe configuration update process described later, a non-allocated block temporarily exists in a stripe configuration before update. Information identifying the block is indicated in node #2070 and LBA #2071.

The use of the non-allocated block management table 1008 is described in detail together with the following description of the stripe configuration update process.

FIG. 14 is a diagram depicting an overview of the stripe configuration update process to be executed upon the addition of a node 100 according to the first embodiment. The first embodiment describes an example in which a new node 100-5 (#4) is added to a RAID group of 3D+1P composed of nodes 100-1 to 100-4 (#0 to #3). The following describes the nodes 100-1 to 100-5 as nodes #0 to #4. In addition, the node #4 that is newly added is referred to as additional node.

(1) indicates a configuration of the nodes 100 immediately after the addition. Specifically, (1) indicates a state immediately after the single node (node #4) is added from a state in which the 4 nodes #0 to #3 configure the RAID group of 3D+1P. In the drawing, "Ax", "Bx", and the like indicate data blocks, and "Px" indicates parity blocks, where x=0 to n.

In addition, stripe blocks 202 connected to each other by a solid line indicate stripe blocks 202 forming a single stripe 203. In the example depicted in FIG. 14, A0, B0, C0, and P0 form a stripe 203-0.

As a prerequisite, the process is executed in a state in which 0 (predetermined data that is not affected by a value of a parity) is stored in each of all stripe blocks 202 of the added node (node #4), or 0 is internally stored in each of all the stripe blocks 202.

In the following, a stripe # (number) of a stripe 203 including a stripe block #x of the node #0 is defined as a stripe #x. However, x=0 to n. Specifically, a stripe including A0 is treated as a stripe #0, and a stripe 203 including A1 is treated as a stripe #1.

(2) indicates an example in which the stripe #0 is reconfigured. The computer system 1 calculates and generates an intermediate parity (Pi) from a parity block (P0) of the stripe #0 and a predetermined data block (D1) of the node (node #3) including the parity block.

The computer system 1 causes the intermediate parity (Pi) to be stored as a new parity (P'0) in a predetermined block within the additional node (node #4). In the first embodiment, the intermediate parity (Pi) is calculated from an XOR of P0 and D1. "XOR" is an operation to be used to calculate an exclusive OR. Hereinafter, the "XOR" operation is described as a symbol "+" for simplicity.

By the aforementioned process, stripe blocks 202 forming the stripe #0 (203-0') are updated to A0, B0, C0, D1, and P'0. Since P0=A0+B0+C0 and P'0=Pi=P0+D1, P'0=A0+B0+C0+D1 and P'0 satisfies a requirement as a parity of the stripe #0.

In addition, information (the identifier of the node 100 and the position of the block) of the parity block (P0) removed (disabled) from the stripe #0 for the reconfiguration of the stripe #0 is stored in the non-allocated block management table 1008. The parity block (P0) removed from the stripe #0 is managed as a non-allocated stripe block 202.

Since only the intermediate parity Pi is transferred to the node #4 in the aforementioned process, it is possible to reduce the amount of data to be migrated between nodes and suppress a delay in the process.

In addition, the intermediate parity Pi is calculated by calculating an exclusive OR of the parity block (P0) that previously belonged to the stripe #0 and the data block (D1) newly added to the stripe #0 in the same node #3 as that of the parity block. Thus, since it is sufficient if a parity is calculated from stripe blocks 202 within the same node, access does not need to be made between nodes and the calculation process can be executed at a high speed.

(3) indicates an example in which the stripe #1 (203-1') is reconfigured. The order of the stripe #1 to be subjected to a reconfiguration process is uniquely determined based on a stripe number including data blocks used upon the genera-tion of an intermediate parity in the process previously executed on the stripe. Details of the determination are described later.

The computer system 1 generates the intermediate parity (Pi) using an exclusive OR from a parity block (P1) of the stripe #1 and a predetermined data block (C2) included in the node (node #2) including the parity block.

Next, the computer system 1 transfers the generated intermediate parity (Pi) to the node (node #3) storing the disabled parity block (P0) in the process (index number=0) previously executed on the stripe. The computer system 1 can acquire the position (node, LBA) of the disabled parity block (P0) by referencing the non-allocated block management table 1008 depicted in FIG. 13B.

Next, the node #3 that has received the intermediate parity (Pi) generates a new parity (P'1) from an exclusive OR of the data block (D1) corresponding to the stripe #1 and the intermediate parity (Pi) and stores the generated new parity (P'1) at the position of the disabled parity block (P0).

In the first embodiment, the new parity (P'1) is calculated by Pi+D1. After that, a predetermined data block (E1) within the additional node #4 is defined as a data block of the stripe #1 after the update. Since values of all data blocks of the additional node #4 are 0, a value of the new parity (P'1) does not change.

By the aforementioned process, stripe blocks 202 forming the stripe #1 are updated to A1, B1, C2, P'1, and E1. P1=A1+B1+D1, Pi=P1+C2, and P'1=Pi+D1. Thus, since P'1=A1+B1+C2 and E1=0, P'1+A1+B1+C2+E1 and P'1 satisfies a requirement as a parity of the stripe #1.

The computer system 1 repeatedly executes the same process to update the stripe configuration to a stripe configuration after the addition, as indicated by (4) in FIG. 14. The process is periodically executed and is the same as a process of updating stripes #5k to #5k+4 (k is an integer of 0 or greater), or combined patterns of stripe blocks 202 are the same as the aforementioned stripes #0 to #4.

Types of stripe update processes are different for phases in a cycle. Thus, the types of the stripe update processes described later are depicted as "types of processes" in (4) of FIG. 14. A stripe update process to be executed in a cycle's last phase and a stripe update process to be executed in a cycle's second to last phase are partially different from the above description and are described in detail later.

The computer system 1 and details of processes of the nodes 100 are described below.

Figure 15:
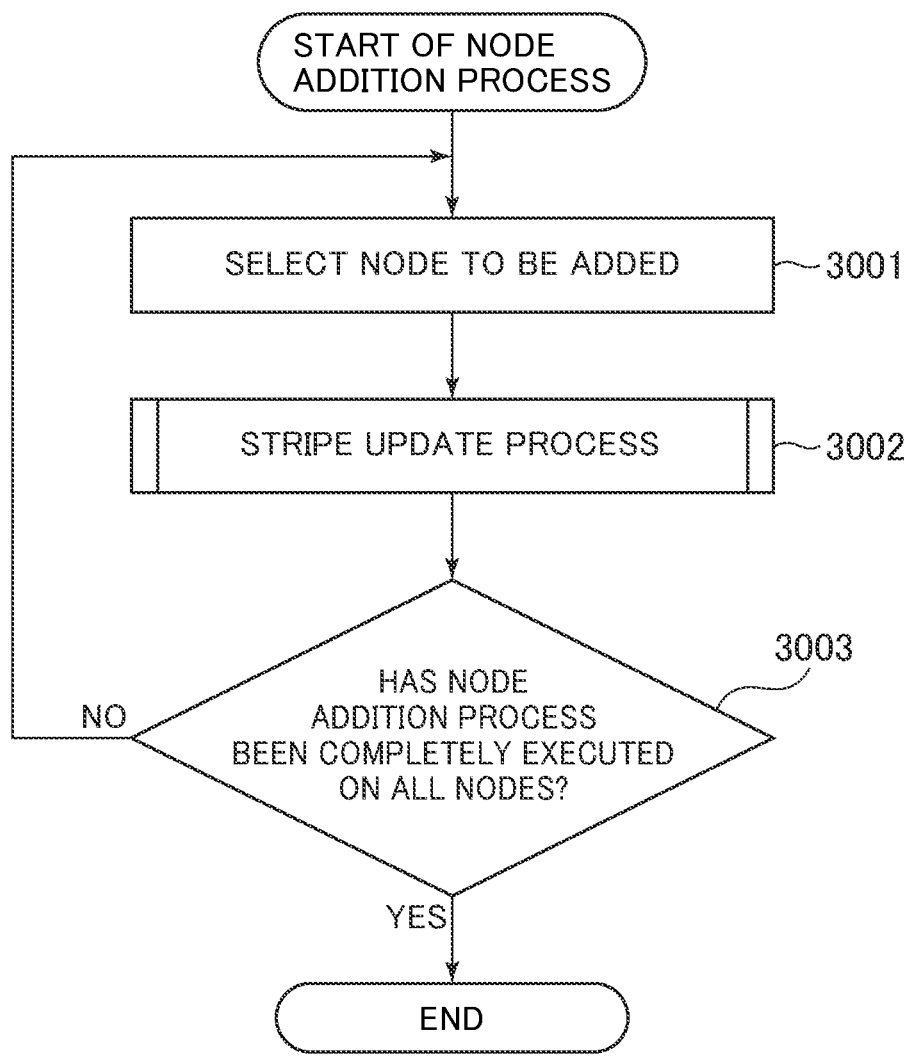
FIG. 15 depicts the first embodiment of the present invention and is a flowchart depicting an example of a process of adding a node.

FIG. 15 is a flowchart depicting an example of a node addition process.

The node addition process program 1101 executes the stripe configuration update process in the case where a node 100 is added to the computer system 1.

The administrator enters an instruction to add a node (or to expand stripes 203) in the managing server 20 after the addition of an additional node 100 to the computer system 1. The managing server 20 receives a RAID group (or the nodes 100) to be subjected to the addition and the additional node and transfers the addition instruction to the nodes 100 to be processed.

As depicted in FIGS. 14 and 7, the first embodiment describes an example in which the node #4 is added to the RAID group (3D+1P) of the nodes #0 to #3, but is not limited to this. For example, when multiple RAID groups are set in the computer system 1, it is sufficient if the managing server 20 references a table (not depicted) indicating correspondence relationships between the RAID groups and nodes 100 and identifies nodes 100 to be processed.

The nodes 100 execute the node addition process in response to the reception of the addition instruction from the managing server 20. In addition, the nodes 100 may automatically execute the node addition process program 1101 in response to the detection of the addition of the node.

Alternatively, any of the nodes 100 to be processed may serve as a master, execute the node addition process program 1101, and notify results of the execution to the other nodes 100. Alternatively, the managing server 20 may execute the node addition process program 1101 and notify the results of the execution to the nodes 100 to be processed.

First, the node addition process program 111 selects the single node 100 (additional node 100 (#4)) as a node to be added from among the nodes 100 to be subjected to the addition process (in step 3101).

For example, the node addition process program 1101 may select target nodes in order of physical node number in the computer system 1 from among nodes that have yet to be subjected to the node addition process and are to be subjected to the addition process.

Next, the node addition process program 1101 executes the stripe configuration update process (in step 3002). The stripe configuration update process is described later.

Next, the node addition process program 1101 determines whether or not the node addition process has been executed on all additional nodes added to the computer system 1 (in step 3003). When the node addition process has not been executed on all the additional nodes (No in step 3003), the node addition process program 1101 causes the process to return to step 3001 and executes the same process on a next target node.

On the other hand, when the node addition process has been executed on all the additional nodes (Yes in step 3003), the node addition process program 1101 terminates the process.

Figure 16:
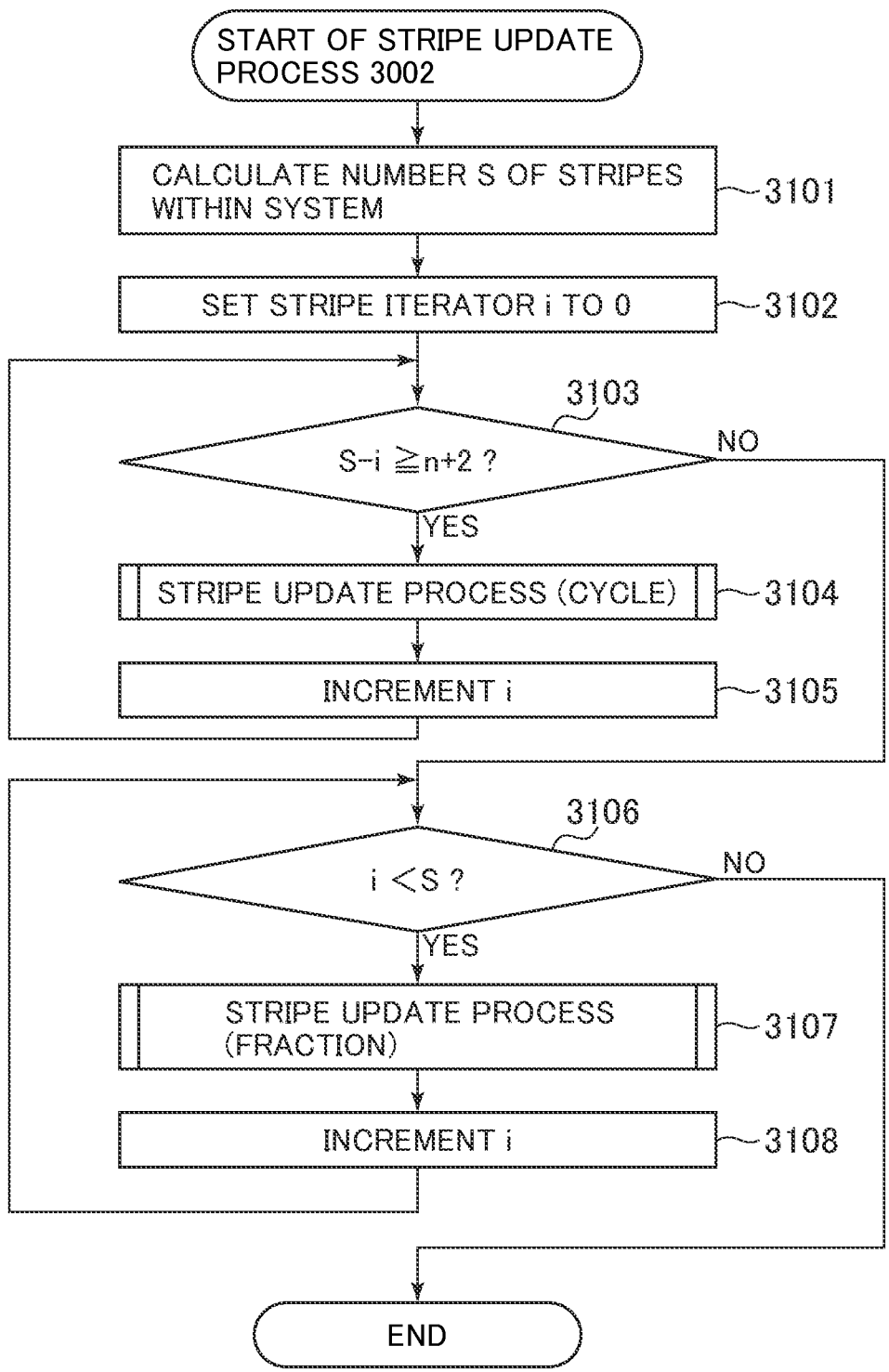
FIG. 16 depicts the first embodiment of the present invention and is a flowchart depicting an example of the stripe configuration update process.

FIG. 16 is a flowchart depicting an example of the stripe configuration update process. In this process that is the process of step 3002 depicted in FIG. 15, the nodes 100 receive the additional node 100 and execute the stripe update process program 1102.

The stripe update process program 1102 generates a stripe pattern after the addition of the node 100 and generates a parity block corresponding to the stripe pattern after the addition in step 3002 of the node addition process depicted in FIG. 15. The generation of the stripe pattern and the generation of the parity block are included in the stripe configuration update process.

First, the stripe update process program 1102 references the stripe management table 1001 and calculates the number (S) of stripes within the computer system 1 (in step 3101).

Next, the stripe update process program 1102 sets a stripe iterator (i) to 0 (in step 3102). The stripe iterator i indicates a currently processed stripe # (number) and is set to a value in a range of 0 to S−1.

Next, the stripe update process program 1102 determines whether or not the difference S−i between the number (S) of stripes and the stripe iterator (i) or the number of non-updated stripes is equal to or larger than a value of (the number (n) of data blocks before expansion+the number of parity blocks+1) (in step 3103). In the first embodiment, since a RAID5 group is used, the number of parity blocks is 1. Thus, the number of phases of a cycle of the stripe update process is n+2. The first embodiment describes an example in which the number (n) of data blocks before the expansion is equal to 3, as depicted in FIG. 14.

When the number of non-updated stripes is equal to or larger than n+2 (Yes in step 3103), the stripe update process program 1102 executes a stripe update process (cycle) (in step 3104). The stripe update process (cycle) is described later. Nodes 100 that include a stripe 203 to be updated may use a cycle indicated by the stripe iterator (i) upon the start of step 3104 or the like.

After the stripe update process (cycle) is executed, the stripe update process program 1102 increments the stripe iterator (i) and executes the determination of step 3103 again.

On the other hand, when the number of non-updated stripes is smaller than n+2 (No in step 3103), the stripe update process program 1102 determines whether or not a non-updated stripe 203 exists or whether or not the stripe iterator (i) is smaller than S (in step 3106).

In the determination of step 3103, whether or not the number (S−i) of non-updated stripes is smaller than the number (n+2) of phases of the cycle of the stripe update process is determined. When the number of non-updated stripes is smaller than the number of phases of the cycle, whether or not the number of non-updated stripes is equal to or smaller than a fraction smaller than the number of phases of the cycle is determined in step 3106.

When a non-updated stripe exists (Yes in step 3106), the stripe update process program 1102 executes a stripe update process (fraction) (in step 3107). The stripe update process (fraction) is described later.

After the stripe update process (fraction) is executed, the stripe update process program 1102 increments the stripe iterator (i) and executes the determination of step 3106 again.

When the non-updated stripe 203 does not exist (No in step 3106), the stripe update process program 1102 terminates the process and causes the process to return to the process depicted in FIG. 15.

When the number (S−i) of non-updated stripes is equal to or larger than the number (n+2) of phases of the cycle of the stripe update process in the aforementioned process, the stripe update process (cycle) of step 3104 is executed. When the number of non-updated stripes becomes smaller than the number of phases of the cycle, the stripe update process (cycle) of step 3104 is switched to the stripe update process (fraction) of step 3107.

Figure 17:
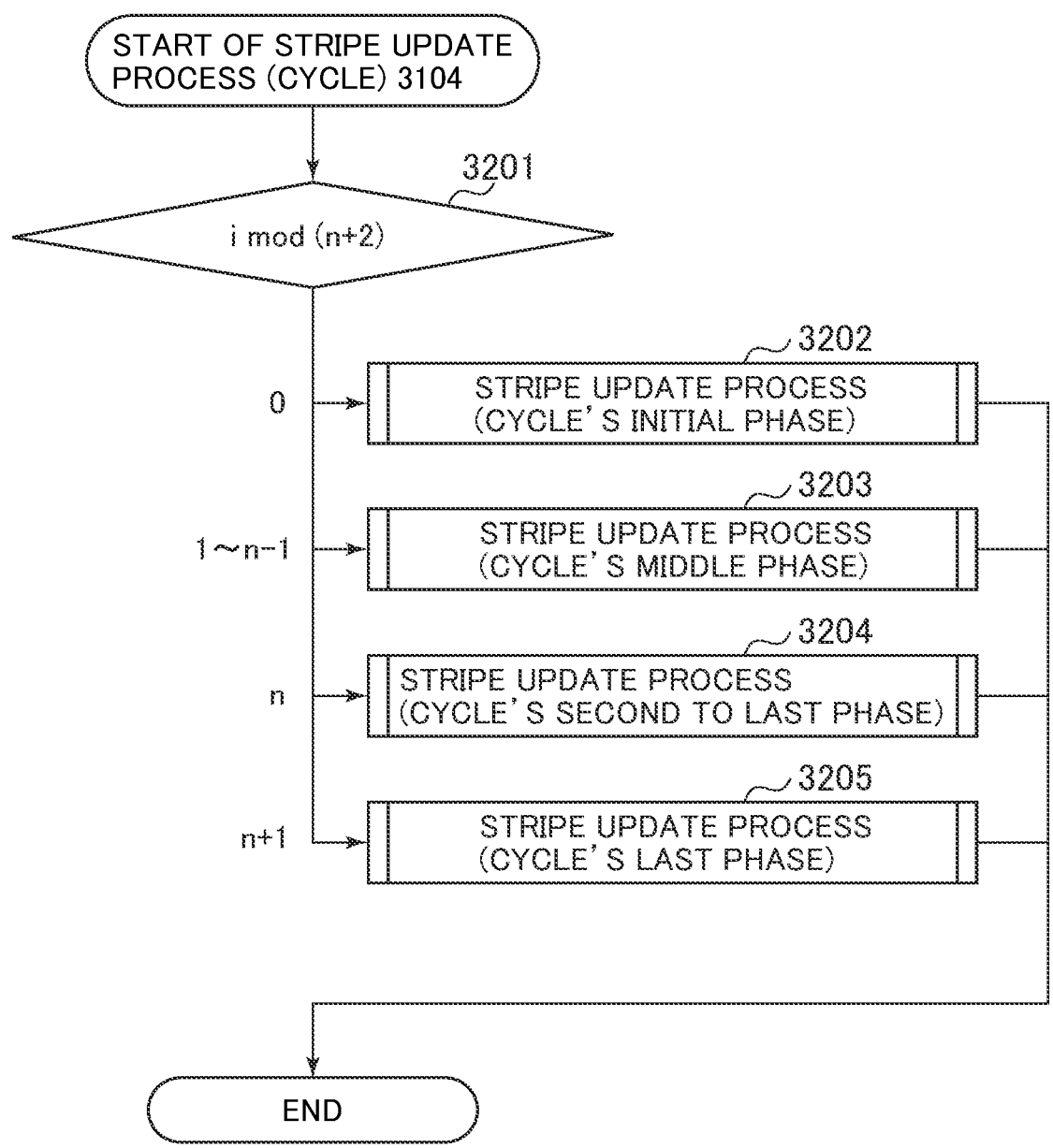
FIG. 17 depicts the first embodiment of the present invention and is a flowchart depicting an example of a stripe configuration update process (cycle).

FIG. 17 is a flowchart depicting an example of the stripe update process (cycle).

The stripe update process (cycle) is executed as a part of the stripe update process program 1102. In step 3104 of the stripe update process depicted in FIG. 16, a stripe pattern of stripes 203 is generated. The stripe pattern is a periodical pattern since the arrangement of parity blocks between nodes 100 is leveled.

First, the stripe update process program 1102 references the stripe iterator (i) and calculates a value of (i mod (n+2)) (in step 3201). n indicates the number of data blocks of a stripe before the expansion. "mod" indicates a function of calculating a remainder by dividing i by n+2.

When the result of the calculation is 0, the stripe update process program 1102 executes the stripe update process (in a cycle's initial phase) (in step 3202). A stripe update process (in a cycle's middle phase) is described later.

When the result of the calculation is equal to or larger than 1 and smaller than n, the stripe update process (in the cycle's middle phase) is executed in the stripe update process (cycle) 3104 (in step 3203). The stripe update process (in the cycle's middle phase) is described later.

When the result of the calculation is n, the stripe update process program 1102 executes a stripe update process (in a cycle's second to last phase) (in step 3204). The stripe update process (in the cycle's second to last phase) is described later.

When the result of the calculation is n+1, the stripe update process program 1102 executes a stripe update process (in a cycle's last phase) (in step 3205). The stripe update process (in the cycle's last phase) is described later.

Regarding the cycle, as depicted in FIG. 14, when the single node #4 is added to the configuration (n=3) of the 4 nodes #0 to #3, the stripe update process program 1102 executes the stripe update process on the stripe #0 (intra-cycle index #2060=0) corresponding to the initial phase of the cycle.

Next, the stripe update process program 1102 increments the stripe iterator (i) so that i=1. Since the remainder calculated in step 3201 is 1, the stripe update process in the cycle's middle phase is executed in step 3203. In step 3203, stripe blocks 202 of the stripe 203 or the stripe #1 are updated.

Next, the stripe update process program 1102 increments the stripe iterator (i) so that i=2. Since the remainder calculated in step 3201 is 2, the stripe update process in the cycle's middle phase is executed in step 3203. In step 3203, stripe blocks 202 of the stripe 203 or the stripe #2 are updated.

Next, the stripe update process program 1102 increments the stripe iterator (i) so that i=3. Since the remainder calculated in step 3201 is 3=n, the stripe update process in the cycle's second to last phase is executed in step 3204. In step 3204, stripe blocks 202 of the stripe 203 or the stripe #3 are updated.

Next, the stripe update process program 1102 increments the stripe iterator (i) so that i=4. Since the remainder calculated in step 3201 is 4=n+1, the stripe update process in the cycle's last phase is executed in step 3205. In step 3205, stripe blocks 202 of the stripe 203 or the stripe #4 are updated.

As described above, when the node #4 is added to the RAID group and the stripes 203 are to be expanded, the process of updating the stripes 203 by distributing the parity blocks to the nodes #0 to #4 is treated as a single cycle, and the stripe update process is repeatedly executed.

Thus, as described above, when a node 100 is added to the stripes 203-0 to 203-9 depicted in FIG. 5B, the stripe update process (3202) in the cycle's initial phase is executed, the stripe update process (3203) in the cycle's middle phase is repeatedly executed, and the stripe update process (3204) in the cycle's second to last phase and the stripe update process (3205) in the cycle's last phase are repeatedly executed.

Figure 18:
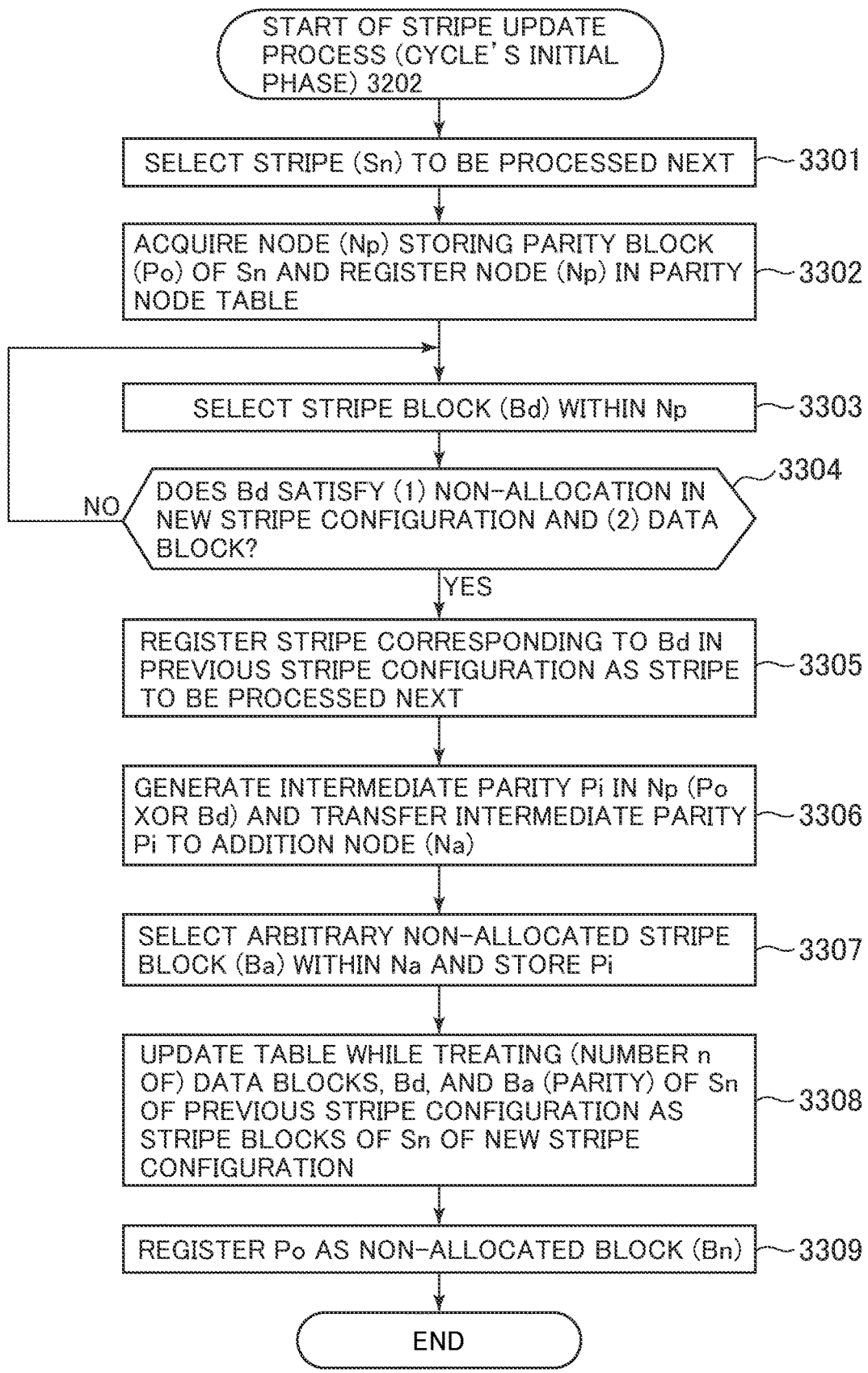
FIG. 18 depicts the first embodiment of the present invention and is a flowchart depicting an example of a stripe configuration update process (in a cycle's initial phase).

FIG. 18 depicts the stripe update process (in the cycle's initial phase). The stripe update process (in the cycle's initial phase) is executed as a part of the stripe update process program 1102 to update a stripe 203 that is among the stripes 203 and corresponds to the initial phase of the cycle of the stripe update process. In FIG. 14, the stripe #0 corresponds to the initial phase of the cycle.

First, the stripe update process program 1102 acquires a stripe (Sn: "S" indicates the "stripe" and "n" indicates "next") to be processed next (in step 3301). The stripe (Sn) to be processed next indicates a stripe 203 to be subjected to the stripe configuration update process next.

When the stripe update process program 1102 initially executes the process, the stripe update process program 1102 references the stripe management table 1001 and treats, as the stripe (Sn) to be processed next, an initial stripe indicated in stripe #2000.

Immediately after a single cycle of the process is completed, the stripe update process program 1102 references the stripe management table 1001 and treats, as the stripe (Sn) to be processed next, a stripe indicated in stripe #2000 and to be processed next after the stripe update process previously executed. In addition, the process is started after intra-cycle index #2060 is reset to "0".

In the stripe update process (in the cycle's initial phase) 3202, the stripe management table 1001 or the update-in-progress stripe management table 1009 may be referenced and a predetermined stripe 203 may be selected from among non-updated stripes 203, but it is preferable that a stripe with the smallest number indicated in stripe #2000 among the non-updated stripes 203 be selected in order to simplify the process.

Next, the stripe update process program 1102 acquires an identifier (#0 to #n) of a node (Np: "N" indicates the "node") storing a parity block (Po: "P" indicates a "parity" and "o" indicates "old") within the stripe (Sn) to be processed next. The node 100 including the parity block (Po) is hereinafter referred to as parity node (Np).

The stripe update process program 1102 sets "0" indicating the cycle's initial phase in intra-cycle index #2060 of the parity node table 1007 and registers the identifier of the acquired parity node (Np) in parity node #2061.

The parity node table 1007 is referenced upon the selection of an intermediate parity generation block in the stripe update process (in the cycle's middle phase) 3203 described later.

Processes of steps 3303 and later are executed by the parity node (Np) and the additional node 100 that has received an intermediate parity from the parity node (Np). The other nodes 100, which are not the parity node (Np) and the additional node 100, stand by until the other nodes 100 receive a notification indicating the completion of the process from the parity node (Np).

Next, the stripe update process program 1102 of the parity node (Np) selects a predetermined stripe block (Bd: "B" indicates the "block" and "d" indicates "data") 202 within the parity node (Np) (in step 3303).

As the stripe block (Bd), a predetermined stripe block within the parity node Np may be selected, but a non-updated stripe block 202 that is among stripe blocks 202 within the parity node (Np) and has the smallest LBA may be preferably selected.

Next, the stripe update process program 1102 determines (1) whether or not the selected stripe block (Bd) is a non-allocated stripe block in a new stripe configuration and (2) whether or not the selected stripe block (Bd) is a data block other than a parity block (in step 3304).

When any of the aforementioned requirements is not satisfied (No in step 3304), the stripe update process program 1102 of the parity node (Np) causes the process to return to step 3303 and selects a different stripe block (Bd) again.

When all the aforementioned requirements are satisfied (Yes in step 3304), the stripe update process program 1102 treats a stripe block 203 corresponding to the selected stripe block (Bd) as a stripe to be processed next in the stripe management table 1001 before the addition and registers the flag in NEXT 2003 of the stripe management table 1001 depicted in FIG. 7 (in step 3305).

Next, the stripe update process program 1102 generates an intermediate parity (Pi: "i" indicates "intermediate") from the parity block (Po) and the stripe block (Bd) in the parity node (Np) and transfers the intermediate parity (Pi) to the additional node (Na: "a" indicates "additional") (in step 3306). The intermediate parity (Pi) is calculated from an XOR of Po and Bd.

Next, in the additional node (Na), the stripe update process program 1102 receives the intermediate parity (Pi) from the parity node (Np). The stripe update process program 1102 of the additional node (Na) selects a predetermined stripe block (Ba) within the additional node (Na) and causes the intermediate parity (Pi) to be stored (in step 3307).

In the stripe update process (in the cycle's initial phase), the intermediate parity (Pi) serves as the parity block. As the stripe block (Ba), a predetermined stripe block within the additional node (Na) may be selected, but a stripe block that is among stripe blocks within the additional node (Na) and has the smallest LBA or the like may be preferably selected.

Next, the stripe update process program 1102 of the parity node (Np) causes a number n+2 of stripe blocks, which are the stripe block (Bd), the stripe block Ba (parity), and a number n of data blocks that are indicated in the stripe management table 1001 before the addition and included in the stripe Sn to be processed next and are stored in the nodes 100 other than the parity node (Np) and the additional node (Na), to be stored in the update-in-progress stripe management table 1009 as stripe blocks of the new stripe configuration, and updates the stripe configuration (in step 3308).

Next, the stripe update process program 1102 registers the parity block (Po) selected in the aforementioned step 3302 as a non-allocated block (Bn: "n" indicates "non-allocated) in the non-allocated block management table 1008 and terminates the stripe update process in the cycle's initial phase.

Since the stripe 203 corresponding to the cycle's initial phase is completely processed, the stripe update process program 1102 of the parity node (Np) notifies the completion of the process to the other nodes 100 storing the stripe 203 and increments the value of intra-cycle index #2060. In addition, the stripe update process program 1102 of the parity node (Np) transmits, to the other nodes 100, differences in the stripe management table 1001, the parity node table 1007, the non-allocated block management table 1008, and the update-in-progress stripe management table 1009 and synchronizes the tables with the tables of the other nodes 100.

As described above, in the stripe update process (in the cycle's initial phase), the intermediate parity (Pi) is calculated from the parity block (Po=P0) of the parity node (Np)=#3 of the stripe Sn (=#0) to be processed and the stripe block (Bd=D1) as indicated by (2) in FIG. 14 and is transferred to the additional node (Na)=#4.

The additional node (Na) that has received the intermediate parity (Pi) writes the intermediate parity (Pi) to a stripe block, which is among non-processed stripe blocks (Ba) and satisfies a predetermined requirement (in which, for example, an LBA is the smallest). Then, the additional node (Na) treats the stripe block as a parity block.

By the aforementioned process, the stripe #0 depicted in FIG. 14 is updated as A0, B0, C0, D1, and P'0 and registered in the update-in-progress stripe management table 1009. Data is migrated only by transferring the intermediate parity (Pi) generated in the node #3 to the parity block P'0 of the node #4. The other stripe blocks A0, B0, C0, and D1 are not migrated and are maintained at previous positions.

Figure 19:
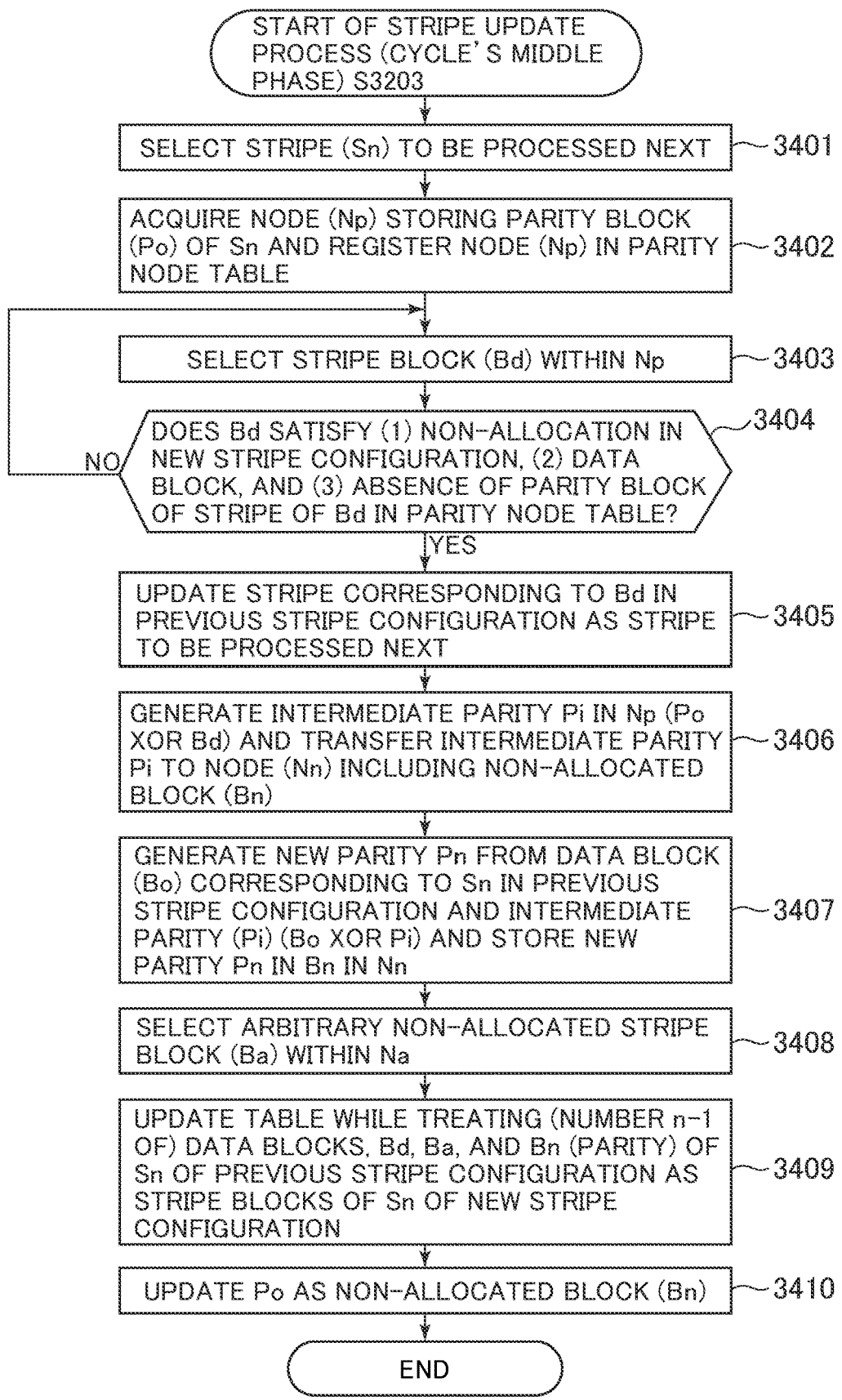
FIG. 19 depicts the first embodiment of the present invention and is a flowchart depicting an example of a stripe configuration update process (in a cycle's middle phase).

FIG. 19 is a flowchart depicting an example of the stripe update process (in the cycle's middle phase).

Figure 20:
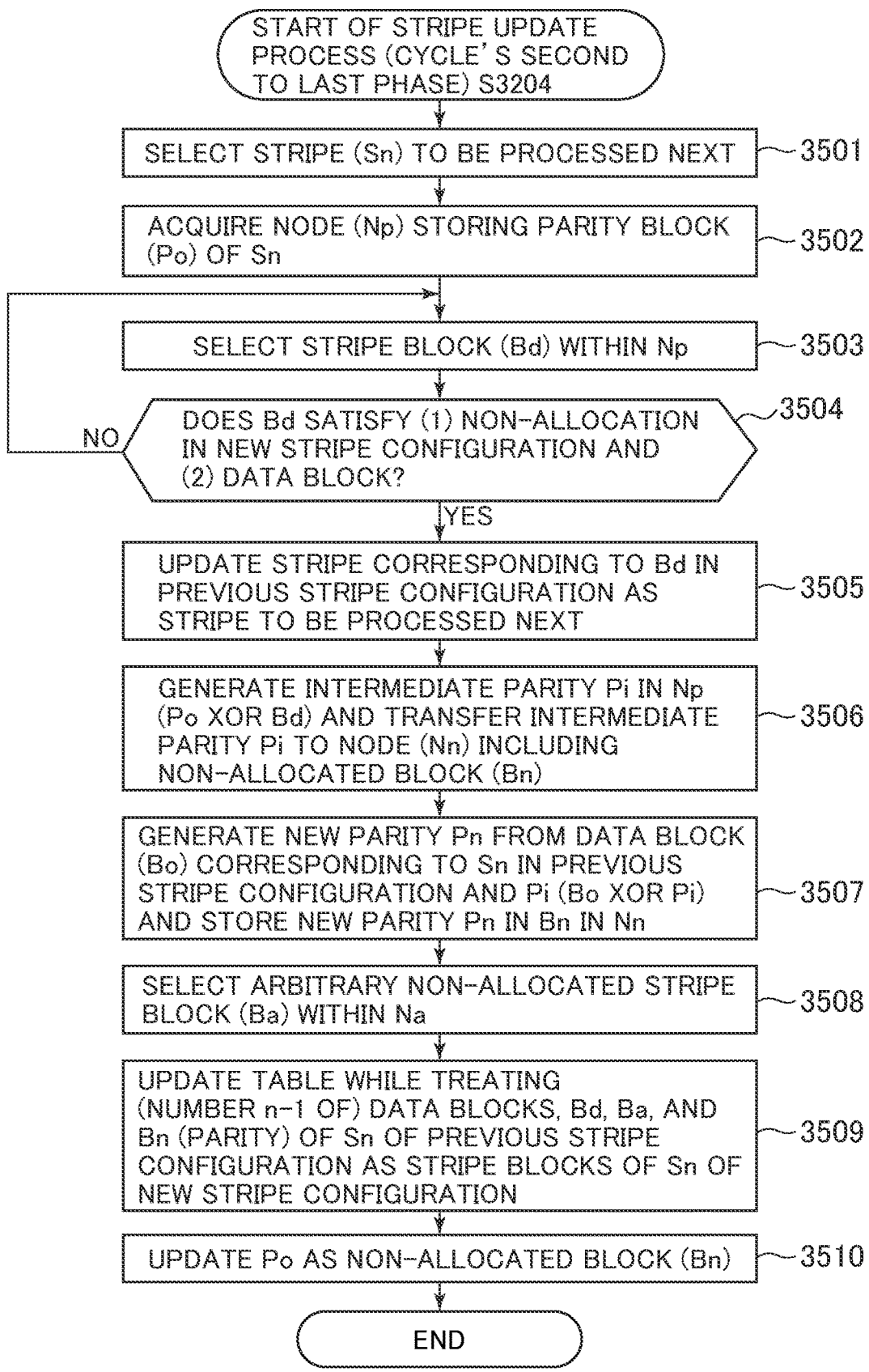
FIG. 20 depicts the first embodiment of the present invention and is a flowchart depicting an example of a stripe configuration update process (in a cycle's second to last phase).
Figure 21:
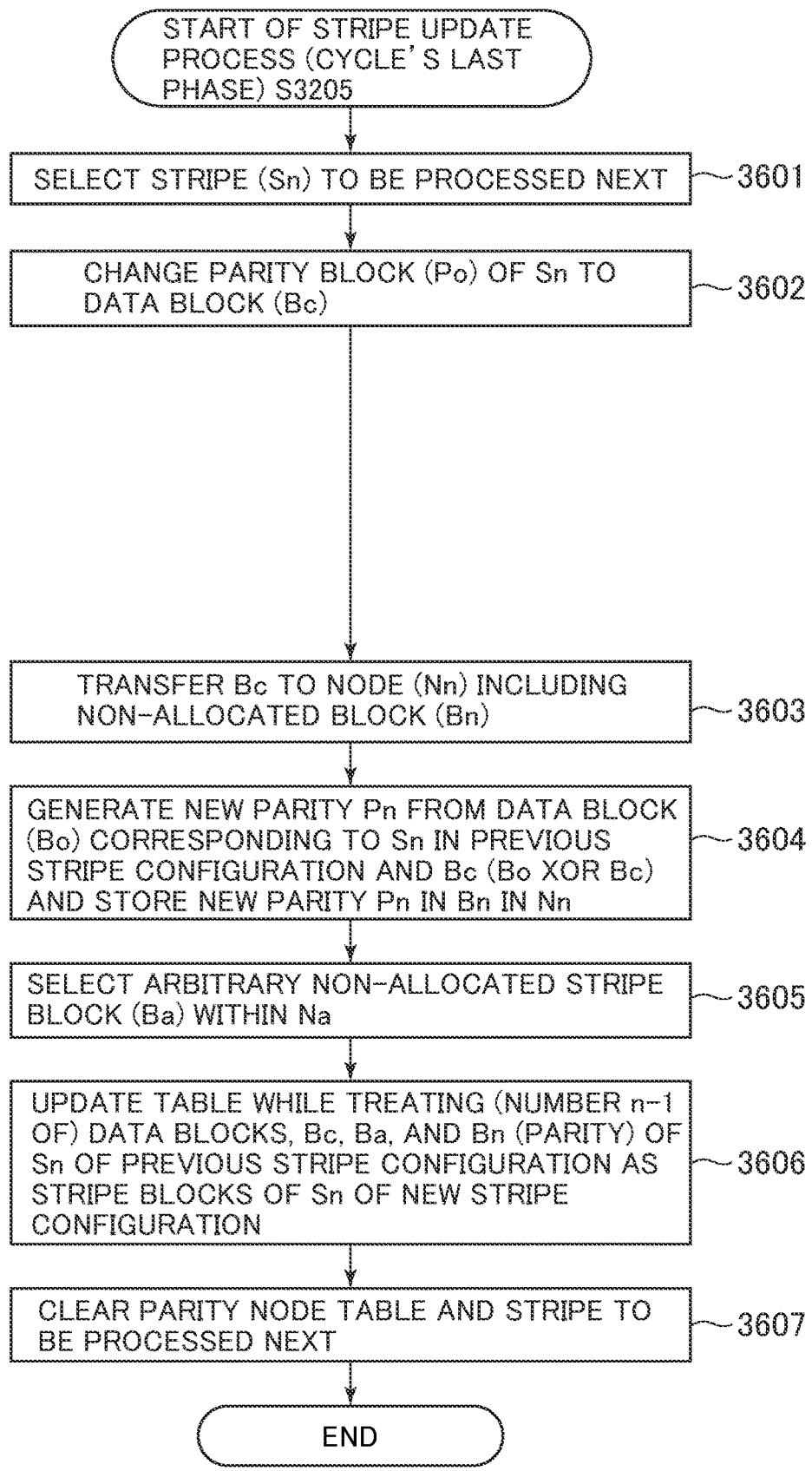
FIG. 21 depicts the first embodiment of the present invention and is a flowchart depicting an example of a stripe configuration update process (in a cycle's last phase).

The stripe update process (in the cycle's middle phase) depicted in FIG. 19, the stripe update process (in the cycle's second to last phase) depicted in FIG. 20, and stripe update process (in the cycle's last phase) depicted in FIG. 21 partially overlap the stripe update process (in the cycle's initial phase) depicted in FIG. 18. Thus, only different parts of the stripe update processes are described below.

The stripe update process (in the cycle's middle phase) is executed as a part of the stripe update process program 1102 in step 3203 depicted in FIG. 17 to update a configuration of stripes other than stripes corresponding to initial, second to last, and last phases of each stripe cycle. In FIG. 14, the stripes #1 and #2 correspond to the middle phase of the cycle.

First, the stripe update process program 1102 acquires a stripe (Sn) to be processed next (in step 3401). In the stripe update process (in the cycle's middle phase), a stripe 203 registered as a stripe to be processed next in the stripe management table 1001 is selected.

The stripe update process program 1102 references the stripe management table 1001 and selects, as the stripe (Sn) to be processed next, a stripe indicated in stripe #2000 in an entry in which "1" is set in NEXT 2003.

After the selection of the stripe (Sn) to be processed next is completed, the stripe update process program 1102 resets NEXT 2003 of the entry to "0".

Next, step 3402 and step 3403 are the same as or similar to step 3302 and step 3303 of the stripe update process (in the cycle's initial phase) depicted in FIG. 18. Specifically, the stripe update process program 1102 acquires a parity block (Po), a parity node (Np), and a stripe block (Bd) and updates the parity node table 1007.

Processes of steps 3403 and later are executed by the parity node (Np) and a node (Nn) that has received an intermediate parity from the parity node (Np). The other nodes 100, which are not the parity node (Np) and the node (Nn), stand by until the other nodes 100 receive a notification indicating the completion of the process from the parity node (Np).

Next, the stripe update process program 1102 determines (1) whether or not the selected stripe block (Bd) is a non-allocated block in the new stripe configuration, (2) whether or not the selected stripe block (Bd) is a data block other than a parity block, and (3) whether a node 100 storing a parity block of a stripe 203 to which the stripe block (Bd) belongs in the stripe management table 1001 before the addition does not exist in the parity node table 1007 (in step 3404).

The determination process of the aforementioned (3) is executed to equally distribute parity blocks of stripes 203 between nodes within the cycle. Specifically, the determination process of the aforementioned (3) corresponds to (3) of FIG. 14. The stripe update process program 1102 selects the parity block (Po=P1), selects the parity node (Np=#2), and selects the stripe block (Bd=C2). Then, the stripe update process program 1102 determines whether or not the stripe #2 to which the stripe block (Bd=C2) belongs exists in the parity node table 1007.

In the example indicated by (3) of FIG. 14, the stripe #1 is currently processed and the stripe #2 has yet to be processed. Thus, the stripe #2 is not registered in parity node #2061 in the parity node table 1007 and the process proceeds to step 3405.

When any of the requirements is not satisfied (No in step 3404), the stripe update process program 1102 causes the process to return to step 3403 to select a different stripe block (Bd) again.

When all the requirements are satisfied (Yes in step 3404), the stripe update process program 1102 executes step 3405.

Step 3405 is the same as or similar to step 3305 of the stripe update process (in the cycle's initial phase) depicted in FIG. 18. Specifically, the stripe update process program 1102 sets NEXT 2003 of the entry of the stripe management table 1001 to "1".

Next, the stripe update process program 1102 generates an intermediate parity (Pi) from an exclusive OR of the parity block (Po) and the stripe block (Bd) in the parity node (Np). Then, the stripe update process program 1102 transfers the intermediate parity (Pi) to the node (Nn) including a non-allocated block (Bn) (in step 3406).

The stripe update process program 1102 of the parity node (Np) treats a value of node #2070 as the transfer destination node (Nn) and treats LBA #2071 as the non-allocated block (Bn) based on the non-allocated block management table 1008 and transfers the intermediate parity (Pi). The stripe update process program 1102 of the parity node (Np) clears an entry read from the non-allocated block management table 1008.

In this process, as indicated by (3) of FIG. 14, the intermediate parity (Pi) is generated from an exclusive OR of the parity block (Po=P1) and the stripe block (Bd=C2) in the parity node (Np=#2). Then, the intermediate parity (Pi) is transferred to the non-allocated block (Bn=P0) of the transfer destination node (Nn=#3) registered in the non-allocated block management table 1008.

Next, the stripe update process program 1102 of the transfer destination node (Nn) generates a new parity (Pn: "n" indicates "new") from the received intermediate parity (Pi) and a data block (Bo) within the transfer destination node (Nn) associated with the stripe (Sn) to be processed next in the stripe management table 1001 before the addition.

Then, the stripe update process program 1102 of the transfer destination node (Nn) causes the new parity (Pn) to be stored in a region of the non-allocated block (Bn) (in step 3407). The new parity (Pn) is calculated from an XOR of Bo and Pi.

In this process, as indicated by (3) of FIG. 14, the data block (Bo=D1) corresponds to the stripe (Sn=#1) to be processed next in the transfer destination node (Nn=#3). The stripe update process program 1102 generates the new parity (Pn) from an exclusive OR of the intermediate parity (Pi) and the data block (D1).

Next, the stripe update process program 1102 instructs the additional node (Na) to select a predetermined non-allocated stripe block (Ba) within the additional node (Na) (in step 3408).

As the stripe block (Ba), a stripe block 202 within the additional node Na may be selected, but a non-allocated stripe block 202 that is included in the additional node Na and has the smallest LBA or the like may be preferably selected.

Next, the stripe update process program 1102 of the parity node (Na) updates the update-in-progress stripe management table 1009 while treating, as stripe blocks of the stripe Sn after the update, a number n+2 of stripe blocks, which are the stripe block (Bd), the stripe block (Ba), the non-allocated block (Bn) (parity), and a number n−1 of data blocks that are indicated in the stripe management table 1001 before the addition and included in the stripe Sn to be processed next and are stored in the nodes 100 other than the parity node (Np), the additional node (Na), and the transfer destination node (Nn) (in step 3409).

In this process, as indicated by (3) of FIG. 14, the stripe blocks 202 corresponding to the stripe (Sn=#1) to be processed next are updated as A1, B1, C2, P'1, and E1.

Next, the stripe update process program 1102 executes the process of step 3410 and terminates the process. Step 3410 is the same as or similar to step 3309 of the stripe update process (in the cycle's initial phase) depicted in FIG. 18.

Since the stripes 203 corresponding to the cycle's middle phase is completely processed, the stripe update process program 1102 of the parity node (Np) notifies the completion of the process to the other nodes 100 storing the stripe 203 and increments the value of intra-cycle index #2060. In addition, the stripe update process program 1102 of the parity node (Np) transmits, to the other nodes 100, differences in the stripe management table 1001, the parity node table 1007, the non-allocated block management table 1008, and the update-in-progress stripe management table 1009 and synchronize the tables with the tables of the other nodes 100.

As described above, in the stripe update process (in the cycle's middle phase), as indicated by (3) of FIG. 14, the intermediate parity (Pi) is calculated from the parity block (Po=P1) of the parity node (Np)=2 of the stripe Sn (=#1) to be processed and the stripe block (Bd=C2) and is transferred to the transfer destination node (Nn=#3).

The transfer destination node (Nn=#3) that has received the intermediate parity (Pi) generates the new parity (Pn) from the data block (Bo=D1) of the stripe #1 to be processed and the intermediate parity (Pi).

Then, the transfer destination node (Nn=#3) writes the new parity (Pn) to the non-allocated stripe block (Ba) and adds the non-allocated stripe block (Ba) of the additional node (Na) to the stripe #1.

By the aforementioned process, the stripe #1 depicted in FIG. 14 and corresponding to the middle phase of the cycle is updated as stripe blocks A1, B1, C2, P'1, and E1 and registered in the update-in-progress stripe management table 1009. Data is migrated only by transferring the intermediate parity (Pi) generated in the node #2 to the parity block P'1 of the node #3. The other stripe blocks A1, B1, and C2 are not migrated and are maintained at previous positions.

In addition, the stripe #2 depicted in FIG. 14 and corresponding to the middle phase of the cycle is processed in the same manner, updated as stripe blocks A2, B3, P'2, D2, and E2, and registered in the update-in-progress stripe management table 1009.

Data is migrated only by transferring the intermediate parity (Pi) generated in the node #1 to the parity block P'2 of the node #2. The other stripe blocks A2, B3, P'2, D2, and E2 are not migrated and are maintained at previous positions.

FIG. 20 is a flowchart depicting an example of the stripe update process (in the cycle's second to last phase). The stripe update process (in the cycle's second to last phase) is executed as a part of the stripe update process program 1102 to update a configuration of a stripe corresponding to the second to last phase of each stripe cycle.

Steps 3501, 3503, and 3504 of the stripe update process (in the cycle's second to last phase) are the same as or similar to steps 3301, 3303, and 3304 of the stripe update process (in the cycle's initial phase), and steps other than steps 3502 and 3504 of the stripe update process (in the cycle's second to last phase) are the same as or similar to the steps of the stripe update process (in the cycle's middle phase).

In step 3502, the stripe update process program 1102 acquires a parity node (Np) storing a parity block (Po) within the stripe (Sn) to be processed next.

In each of the aforementioned stripe update process (in the cycle's initial phase) and the stripe update process (in the cycle's middle phase), the stripe update process program 1102 appropriately selects a stripe (Sn) to be processed next and an acquired parity node (Np) is registered in the parity node table 1007. In the stripe update process (in the cycle's second to last phase), the stripe (Sn) to be processed next is uniquely determined and thus does not need to be registered in the parity node table 1007.

The stripe (Sn) to be processed next may be a next stripe of a stripe 203 processed in the stripe update process (in the cycle's middle phase) depicted in FIG. 19, and the stripe update process program 1102 may select the stripe (Sn) to be processed next from the stripe management table 1001.

Processes of steps 3503 and later are executed by the parity node (Np) and a node (Nn) that has received an intermediate parity from the parity node (Np). The other nodes 100, which are not the parity node (Np) and the node (Nn), stand by until the other nodes 100 receive a notification indicating the completion of the process from the parity node (Np).

Steps 3505 to 3510 are the same as or similar to steps 3405 to 3410 of the aforementioned stripe update process (in the cycle's initial phase) depicted in FIG. 19.

By the aforementioned process, the stripe #3 depicted in FIG. 14 and corresponding to the second to last phase of the cycle is updated as stripe blocks P'4, B4, C4, D4, and E4 and registered in the update-in-progress stripe management table 1009.

Since the stripe 203 corresponding to the second to last phase of the cycle is completely processed, the stripe update process program 1102 of the parity node (Np) notifies the completion of the process to the other nodes 100 storing the stripe 203 and increments the value of intra-cycle index #2060. In addition, the stripe update process program 1102 of the parity node (Np) transmits, to the other nodes 100, differences in the stripe management table 1001, the parity node table 1007, the non-allocated block management table 1008, and the update-in-progress stripe management table 1009 and synchronize the tables with the tables of the other nodes 100.

Data is migrated only by transferring the intermediate parity (Pi) generated in the node #0 to the parity block P'3 of the node #1. The other stripe blocks A4, C3, D3, and E3 are not migrated and are maintained at previous positions.

FIG. 21 is a flowchart depicting an example of the stripe update process (in the cycle's last phase).

The stripe update process (in the cycle's last phase) is executed as a part of the stripe update process program 1102 to update a configuration of a stripe corresponding to the last phase of each stripe cycle.

First, the stripe update process program 1102 executes a process of step 3601. In step 3601, a next stripe of the stripe 203 processed in the stripe update process (in the cycle's second to last phase) is selected as a stripe to be processed from the stripe management table 1001.

Next, the stripe update process program 1102 changes a parity block (Po) within the stripe (Sn) to be processed next to a data block (Bc: "c" indicates "changed") (in step 3602). The reason why this process is executed is that when parity blocks (Po) are distributed and stored in the nodes 100 including the added node #4, a parity block (Po) of at least one stripe needs to be stored in the additional node in the cycle (or already stored in the stripe update process (in the cycle's initial phase)) and needs to be changed to a data block in the cycle.

Processes of steps 3602 and later are executed by a parity node (Np) and a transfer destination node (Nn) that has received an intermediate parity from the parity node (Np).

The other nodes 100, which are not the parity node (Np) and the transfer destination node (Nn), stand by until the other nodes 100 receive a notification indicating the completion of the process from the parity node (Np).

Next, the stripe update process program 1102 transfers the data block (Bc) to the transfer destination node (Nn) including a non-allocated block (in step 3603).

Next, the stripe update process program 1102 generates a new parity (Pn: "n" indicates "new") from the data block (Bc) and a data block (Bo) included in the transfer destination node (Nn) and corresponding to the stripe (Sn) to be processed next in the stripe management table 1001 before the addition. The stripe update process program 1102 causes the generated new parity (Pn) to be stored in a region in which the non-allocated block (Bn) was previously stored (in step 3604). The new parity (Pn) is calculated from an XOR of Bo and Bc.

The next step 3605 is the same as or similar to step 3408 of the stripe update process (in the cycle's middle phase) depicted in FIG. 19. Specifically, the stripe update process program 1102 instructs the additional node (Na) to select a predetermined non-allocated stripe block (Ba) included in the additional node (Na). The additional node (Na) transmits a response indicating the position (LBA) of the selected stripe block 202.

Next, the stripe update process program 1102 selects, as stripe blocks 202 of the stripe (Sn) to be processed next in the stripe management table 1001 before the addition and included in new stripes, a number n+2 of stripe blocks, which are Bc, Ba, Bn (parity), and a number n−1 of data blocks that are indicated in the stripe management table 1001 before the addition and included in the stripe (Sn) to be processed next and are stored in the nodes other than the parity node (Np), the additional node (Na), and the transfer destination node (Nn), and updates the update-in-progress stripe management table 1009 (in step 3606).

Next, the stripe update process program 1102 clears the parity node table 1007 and the stripe to be processed next and indicated in NEXT 2003 of the stripe management table 1001 and terminates the process (in step 3607).

Since the stripe 203 corresponding to the last phase of the cycle is completely processed, the stripe update process program 1102 of the parity node (Np) notifies the completion of the process to the other nodes 100 within the stripe 203 and increments the value of intra-cycle index #2060. In addition, the stripe update process program 1102 of the parity node (Np) transmits, to the other nodes 100, differences in the stripe management table 1001, the parity node table 1007, the non-allocated block management table 1008, and the update-in-progress stripe management table 1009 and synchronizes the tables with the tables of the other nodes 100.

As indicated by (3) in the example of FIG. 14, by the aforementioned process, the stripe #4 is selected as the stripe corresponding to the last phase of the cycle and to be processed next and the parity block P4 of the node #3 is selected as the parity block (Po). The parity block P4 is rewritten to the data block D4. In the first embodiment, a value of the rewritten data block D4 is "0" that is a predetermined value.

Next, the value of the data block D4 is transferred to the node #0 having a non-allocated block (Bn=P3). Then, a new parity (Pn) is generated from an exclusive OR of the data blocks B4 and C4 of the previous stripe configuration (=stripe #4) and the value of the transferred data block D4 and stored in the non-allocated block (Bn=P'4) of the node #0.

The non-allocated stripe block (Ba=E4) included in the additional node (Na) is selected. Then, the number n−1 (2) of data blocks B4 and C4, the rewritten data block D4, the data block E4 of the additional node (Na), and the new parity (Pn) of the transfer destination node (Nn), which are included in the stripe #4 included in the previous stripe configuration and to be processed next, are stored as stripe blocks 202 of the new stripe #4 in the update-in-progress stripe management table 1009.

Figure 22:
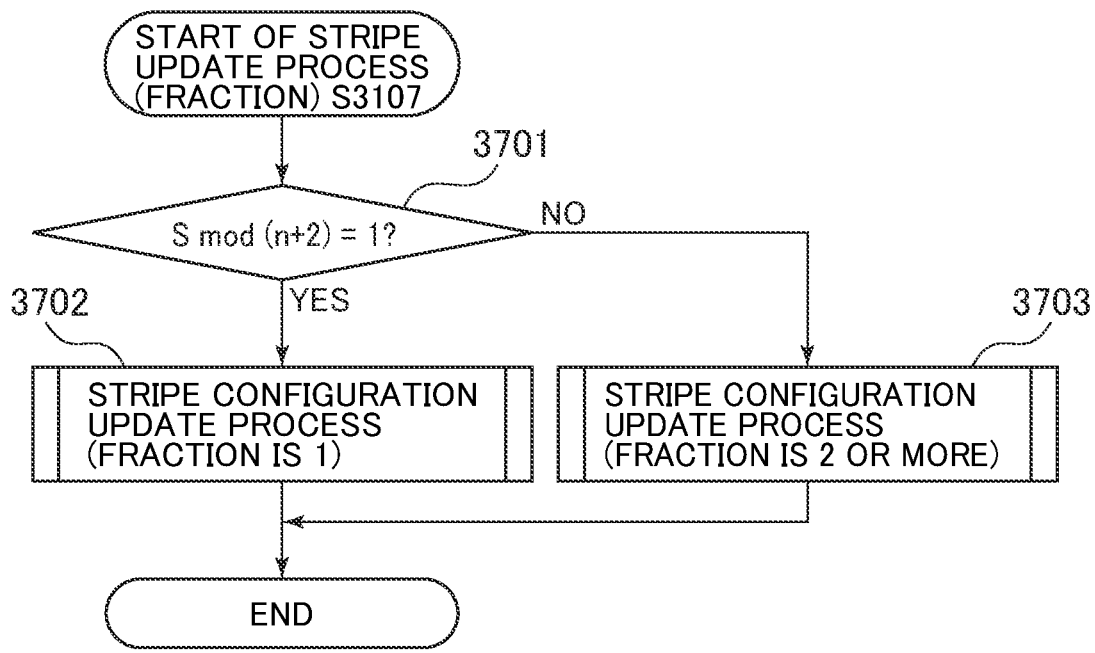
FIG. 22 depicts the first embodiment of the present invention and is a flowchart depicting an example of a stripe configuration update process (fraction).

FIG. 22 is a flowchart depicting an example of the stripe update process (fraction). This process is executed in step 3107 depicted in FIG. 16. The stripe update process (fraction) is executed as a part of the stripe update process program 1102 to update a stripe 203 that is among stripes to be processed in the computer system 1 and corresponds to a fraction smaller than the number (n+2) of phases of the cycle of the update of the stripe configuration.

The stripe update process (fraction) varies based on whether or not a fraction that is the number of stripes is 1. Thus, first, the stripe update process program 1102 calculates the fraction that is the number of stripes (in step 3701). Specifically, it is sufficient if whether or not S mod (n+2) is equal to 1 is determined.

When the fraction that is the number of stripes is 1 (Yes in step 3701), the stripe update process program 1102 executes the stripe update process (fraction is 1) (in step 3702). The stripe update process (fraction is 1) is described later.

When the fraction that is the number of stripes is 2 or more (No in step 3701), the stripe update process program 1102 executes the stripe update process (fraction is 2) (in step 3703). The stripe update process (fraction is 2 or more) is described later.

Figure 23:
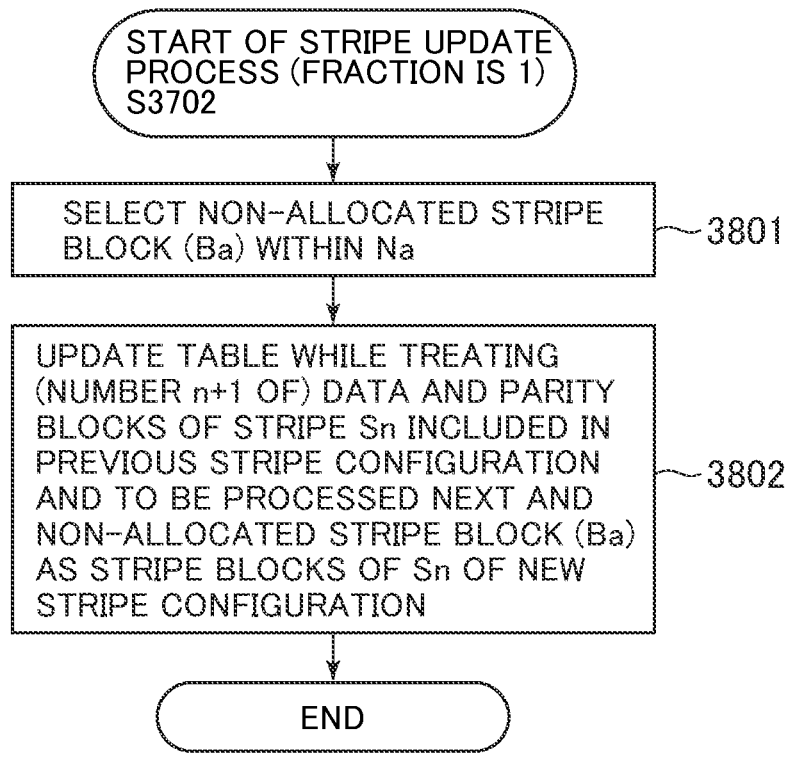
FIG. 23 depicts the first embodiment of the present invention and is a flowchart depicting an example of a stripe configuration update process (fraction is 1).

FIG. 23 is a flowchart depicting an example of the stripe update process (fraction is 1). This process is executed in step 3702 depicted in FIG. 22. The stripe update process (fraction) is executed as a part of the stripe update process program 1102. When the fraction that is the number of stripes 203 to be processed in the computer system 101 and is smaller than the number of phases of the cycle of the update of the stripe configuration is 1, the stripe update process (fraction is 1) is executed to update the stripe configuration corresponding to the fraction.

First, the stripe update process program 1102 selects a non-allocated stripe block (Ba) included in the additional node (Na) (in step 3801). In the stripe update process (fraction is 1), the number of non-updated stripes is 1 and the non-allocated stripe block (Ba) is uniquely determined.

Next, the stripe update process program 1102 updates the update-in-progress stripe management table 1009 while treating, as stripe blocks 202 of the stripe (Sn) included in the new stripe configuration and to be processed next, a number n+2 of stripe blocks, which are the non-allocated stripe block (Ba), the parity block (Po), and a number n+1 of data blocks corresponding to the stripe (Sn) indicated in the stripe management table 1001 before the addition and to be processed next (in step 3802). Then, the stripe update process program 1102 terminates the process.

The predetermined value of 0 is stored in the non-allocated stripe block (Ba). Thus, after the update, the same value can be used for the parity block (Po) indicated in the stripe management table 1001 before the addition.

Figure 24:
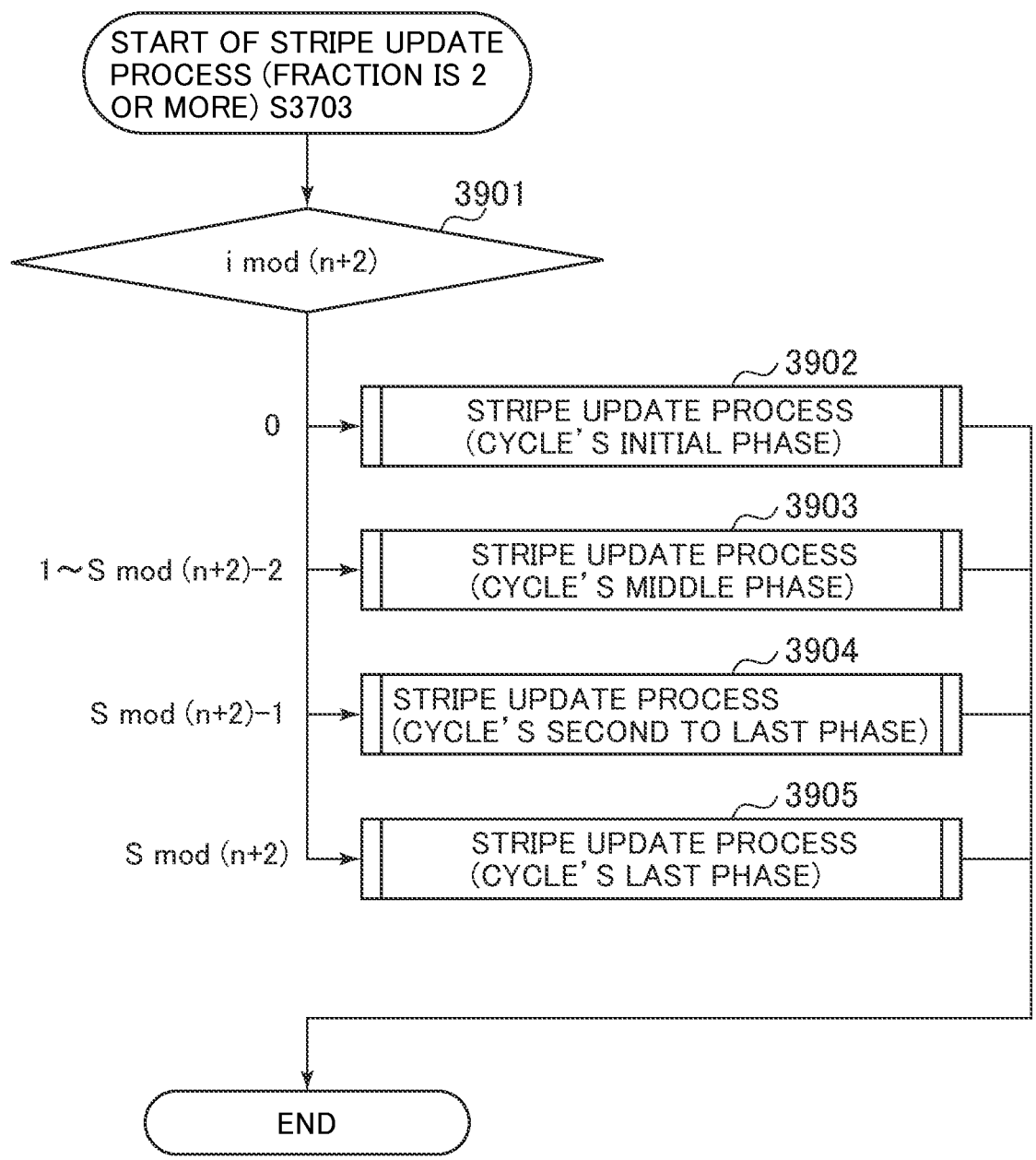
FIG. 24 depicts the first embodiment of the present invention and is a flowchart depicting an example of a stripe configuration update process (fraction is 2 or more).

FIG. 24 is a flowchart depicting an example of the stripe update process (fraction is 2 or more). This process is executed in step 3703 depicted in FIG. 23. The stripe update process (fraction is 2 or more) is executed as a part of the stripe update process program 1102. When the fraction that is the number of stripes 203 to be processed in the computer system 1 and is smaller than the number (n+2) of phases of the cycle of the update of the stripe configuration is 2 or more, the stripe update process (fraction is 2 or more) is executed to update the stripe configuration corresponding to the fraction.

The following assumes that the fraction that is the number of stripes is k (=S mod (n+2)). Specifically, 2 k<n+2.

First, the stripe update process program 1102 references the stripe iterator (i) and calculates a value of (i mod (n+2)) (in step 3901).

When the result of the calculation is 0, the stripe update process program 1102 executes the stripe update process (in the cycle's initial phase) depicted in FIG. 18 (in step 3902).

When the result of the calculation is equal to or larger than 1 and smaller than k−2, the stripe update process program 1102 executes the stripe update process (in the cycle's middle phase) depicted in FIG. 19 (in step 3903).

When the result of the calculation is k−1, the stripe update process program 1102 executes the stripe update process (in the cycle's second to last phase) depicted in FIG. 20 (in step 3904).

When the result of the calculation is k, the stripe update process program 1102 executes the stripe update process (in the cycle's last phase) depicted in FIG. 21 (in step 3905).

By the aforementioned process, the stripe configuration of stripes 203 of which the fraction is smaller than the number (n+2) of phases of the cycle of the update of the stripe configuration is updated.

Figure 25:
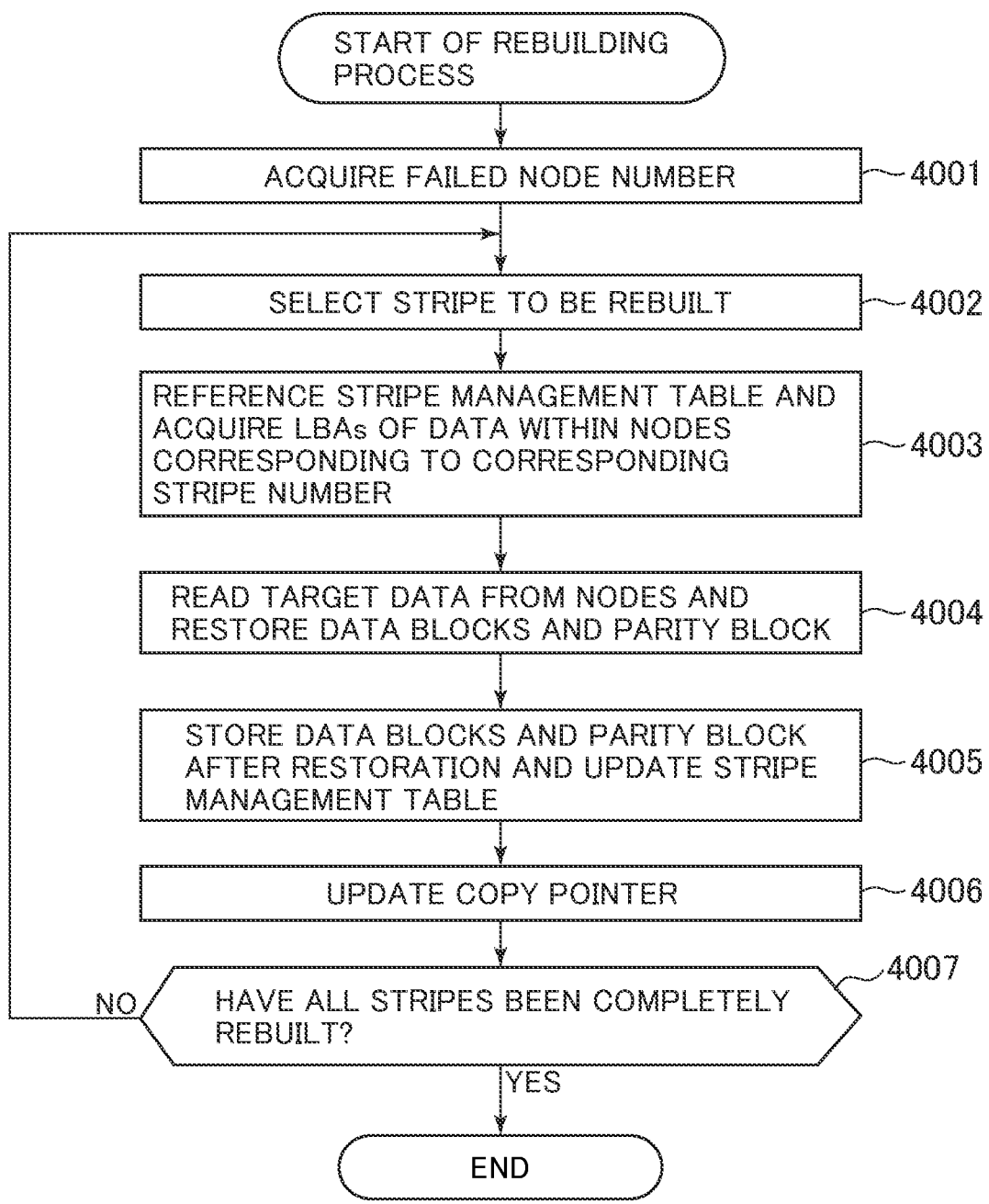
FIG. 25 depicts the first embodiment of the present invention and is a flowchart depicting an example of a rebuilding process upon a failure of a node.

FIG. 25 is a flowchart depicting an example of a rebuilding process upon a failure of a node.

The rebuilding process program 1103 is automatically executed when the computer system 1 detects a failure of any of nodes 100. Alternatively, when a failure occurs in any of the nodes 100, the rebuilding process program 1103 is executed in accordance with an instruction from the managing server 20. The first embodiment describes an example in which data is restored for a spare node 100 (hereinafter referred to as spare node).

First, the rebuilding process program 1103 acquires, as a failed node number, an identifier of a node 100 in which a failure has occurred (in step 4001). Next, the rebuilding process program 1103 acquires, as a stripe number, a stripe number to be rebuilt (in step 4002). As the stripe number to be rebuilt, the smallest stripe number among stripes 203 that are not subjected to a rebuilding process is selected.

Next, the rebuilding process program 1103 references the stripe management table 1001 and acquires LBAs of stripe blocks corresponding to the stripe number and included in the nodes (in step 4003).

Next, the rebuilding process program 1103 transfers multiple data items (data blocks and a parity block) identified by the LBAs in step 4003 from the nodes 100 to the spare node and restores lost data (in step 4004).

Next, the rebuilding process program 1103 causes the restored data to be stored in a predetermined region included in the spare node and updates the stripe management table 1001 (in step 4005).

Next, the rebuilding processing program 1103 updates the copy pointer 1010 (in step 4006). The copy pointer 1010 is a variable to be used to determine whether or not target data is acquired from the spare node in accordance with a read request issued from the host 10 or is acquired by collection read, for example.

Specifically, when a request to read data within a stripe 203 whose stripe number is smaller than the copy pointer 1010 is issued, all stripe blocks corresponding to the stripe number are already restored, the data to be read is acquired based on the stripe management table 1001 and a response is given to a source of the request.

On the other hand, when the data is included in the stripe whose stripe number is larger than the copy pointer 1010 and a corresponding node 100 is in a failed state in the node management table 1002, a certain number of stripe blocks that are other than the target data and necessary for the restoration are acquired based on the stripe management table 1001. After a restoration process is executed, a response is given to the source of the request.

Next, the rebuilding process program 1103 determines whether or not the process of rebuilding the stripes 203 to be restored has been completed (in step 4007). When the process of rebuilding the stripes 203 to be restored has not been completed (No in step 4007), the process is returned to step 4002 to reselect a stripe number to be rebuilt. When the process of rebuilding the stripes 203 to be restored has been completed (Yes in step 4007), the process is terminated.

As described above, according to the first embodiment, when an additional node 100 is added to expand the stripes 203, the stripe update process program 1102 can update the stripe configuration by migrating at least one stripe block 202 to another node 100 for each stripe 203.

Specifically, in the first embodiment, the stripe update process program 1102 generates an intermediate parity in one node 100, transfers a parity block of the intermediate parity to another node 100, and generates, in the node 100 that has received the intermediate parity, a new parity using the intermediate parity and data existing in the node 100.

Thus, in the first embodiment, when a node 100 is added to expand the stripe configuration, the amount of data to be migrated between nodes 100 can be reduced to 1/N of an entire capacity (N is the number of nodes within the system). Thus, even in a scale-out configuration with a narrow network band between nodes 100, capacity efficiency can be improved at a high speed.

In addition, since not all data blocks within each stripe 203 need to be migrated, a load caused by the parity calculation can be reduced.

Second Embodiment

Figure 26:
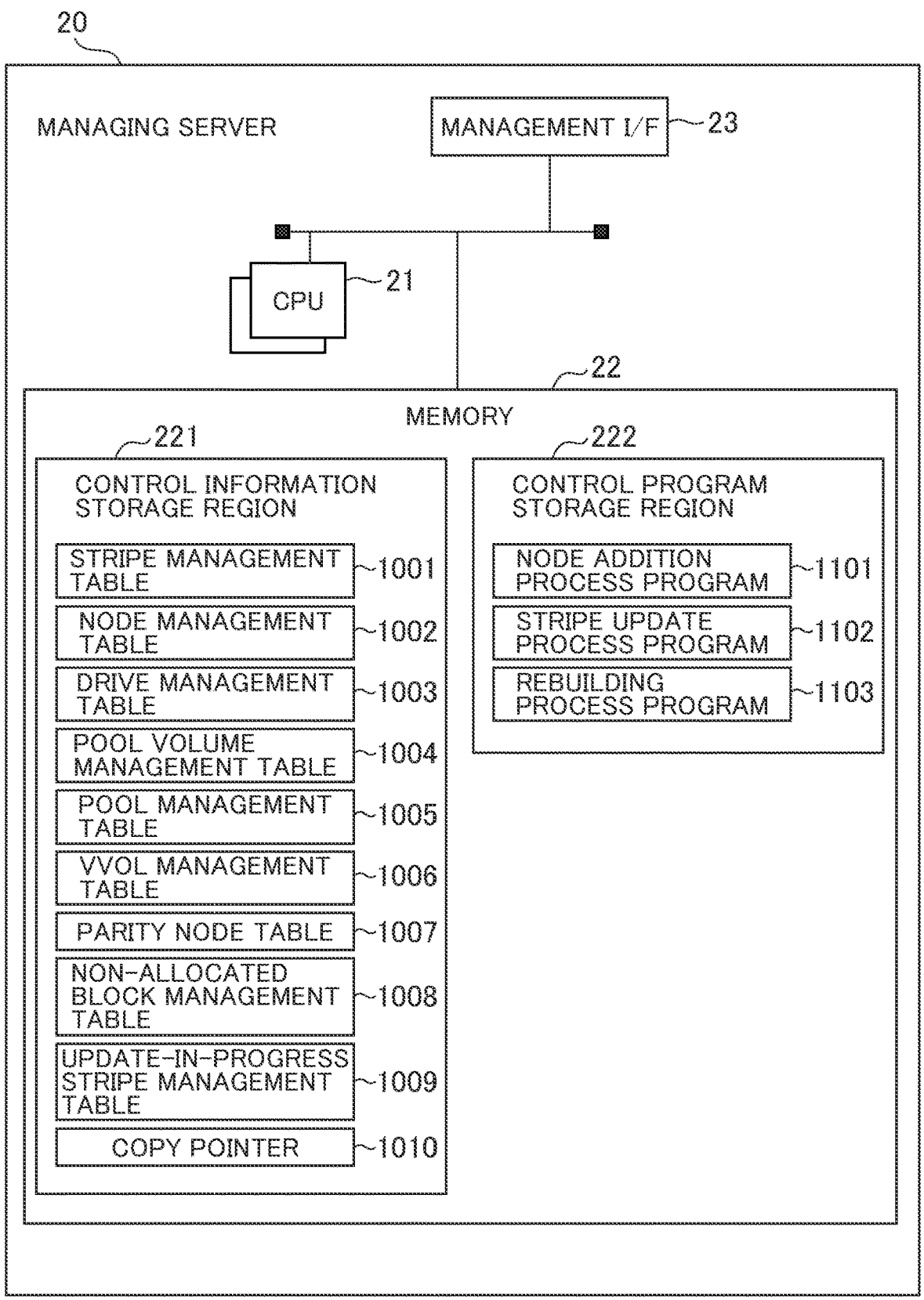
FIG. 26 depicts a second embodiment of the present invention and is a block diagram depicting an example of a configuration of a managing server.

FIG. 26 depicts a second embodiment and is a block diagram depicting an example of the managing server 20. The first embodiment describes the example in which the nodes 100 mainly execute the stripe update process program 1102. The second embodiment, however, describes an example in which the managing server 20 mainly executes a stripe update process program 1102.

The managing server 20 includes a CPU 21 for executing arithmetic processing, a memory 22 for storing programs and data, and a management I/F 23 connected to the nodes 100 via a network 30.

In the memory 22, a control program storage region 222 for storing the various programs and a control information storage region 221 for storing various types of information are set.

The control program storage region 222 stores the node addition process program 1101, the stripe update process program 1102, and a rebuilding process program 1103, which are the same as or similar to those described in the first embodiment. The I/O process program 1104 described in the first embodiment is executed by each node 100.

The control information storage region 221 stores a stripe management table 1001, a node management table 1002, a drive management table 1003, a pool volume management table 1004, a pool management table 1005, a VVOL management table 1006, a parity node table 1007, an update-in-progress stripe management table 1009, a non-allocated block management table 1008, and a copy pointer 1010, which are the same as or similar to those described in the first embodiment.

The parity node table 1007, the non-allocated block management table 1008, and the copy pointer 1010 are set in each node 100.

The managing server 20 executes the node addition process program 1101 and the stripe update process program 1102 to instruct each node 100 to update the stripe configuration upon the addition of a node 100. Details of this process are the same as or similar to those described in the first embodiment, and a description thereof is omitted.

In the second embodiment, the amount of data to be migrated between nodes 100 can be reduced to 1/N of the entire capacity (N is the number of nodes within the system).

CONCLUSION

Although the first and second embodiments describe the case where a RAID group is configured by multiple nodes 100, the embodiments may be applied to a storage device in which a RAID group is configured by multiple storage drives 160. In this case, stripes are configured in the same manner as the aforementioned first and second embodiments when a storage drive 160 is added.

Specifically, even when nodes are computers providing storage regions or are storage drives providing storage regions, the present invention is applicable. When the nodes are the computers providing the storage regions, the nodes 100 or the managing server 20 may execute the stripe update process in the same manner as the first or second embodiment. In addition, when the nodes are the storage drives providing the storage regions, a processor for controlling the nodes may execute the process of updating stripes configured in the multiple storage drives.

The present invention is not limited to the embodiments and includes various modified examples. For example, the embodiments are described in detail in order to clearly explain the present invention and may not include all the configurations described above. In addition, one or more of the configurations described in a certain one of the embodiments can be replaced with a configuration described in the other embodiment. In addition, a configuration described in a certain one of the embodiments can be added to a configuration described in the other embodiment. Furthermore, the addition, removal, and replacement of one or more of the configurations described in the embodiments can be executed independently or in combination.

In addition, a part or all of the aforementioned configurations, functions, processing units, processing means, and the like may be enabled by hardware, for example, by designing an integrated circuit. In addition, the aforementioned configurations, functions, and the like may be enabled by software, for example, by causing a processor to interpret and execute programs providing the functions. Information of the programs, the tables, files, and the like may be stored in a recording device such as a memory, a hard disk, or an SSD or a recording medium such as an IC card, an SD card, or a DVD.

In addition, control lines and information lines are shown, which are considered necessary for the sake of explanation, and all control lines and information lines required for a product may not be necessarily shown. In fact, almost all configurations may be considered to be connected to each other.

The invention claimed is:

1. A storage system comprising:
a plurality of nodes each including a processor, a memory, and a storage region and forming a stripe including a data block and a parity block,
wherein in a process of updating the stripe, the processors generate an intermediate parity from a data block included in a first node and a parity block included in the first node and included in the stripe to be processed, transfer the intermediate parity to a second node, cause the intermediate parity to be stored as a parity in a block of the second node, and configure the stripe with the data block from which the intermediate parity has been generated, the block storing the parity, and a data block included in a node other than the first and second nodes and included in the stripe to be processed.

2. The storage system according to claim 1,
wherein the second node storing the parity does not store the data blocks of the stripe to be processed before the update process.

3. The storage system according to claim 1,
wherein the parity is generated from the intermediate parity and a data block included in the second node and included in the stripe to be processed and is stored in the second node, and
wherein in a configuration of the stripe, an additional data block is included in a node not storing the data blocks of the stripe to be processed before the update process.

4. The storage system according to claim 3,
wherein the additional data block stores predetermined data that is not affected by a value of the parity.

5. The storage system according to 1,
wherein when the stripe is configured, the stripe to be processed is released.

6. The storage system according to claim 1,
wherein the data block from which the intermediate parity has been generated belongs to the configured stripe and another stripe after the process of updating the stripe to be processed, and
wherein when the other stripe is updated as a stripe to be processed, a block is removed from the other stripe.

7. The storage system according to claim 6,
wherein in an update process before the process of updating the stripe to be processed, the parity is stored in the block removed from the other stripe.

8. The storage system according to claim 1,
wherein when the node is added, the update process is executed on the multiple stripes.

9. A method for controlling a storage system including a plurality of nodes each including a processor, a memory, and a storage region and forming a stripe including a data block and a parity block, the method comprising:
causing, in a process of updating the stripe, the processors to
execute a process of generating an intermediate parity from a data block included in a first node and a parity block included in the first node and included in the stripe to be processed,
execute a parity storage process of transferring the intermediate parity to a second node and causing the intermediate parity to be stored as a parity in a block of the second node, and
execute a stripe configuration process of configuring the stripe with the data block from which the intermediate parity has been generated, the block storing the parity, and a data block included in a node other than the first and second nodes and included in the stripe to be processed.

* * * * *